(12) United States Patent
Watanabe

(10) Patent No.: US 8,412,033 B2
(45) Date of Patent: Apr. 2, 2013

(54) IMAGE BLUR CORRECTION DEVICE, IMAGING LENS UNIT, AND CAMERA UNIT

(75) Inventor: Hiroyuki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 120 days.

(21) Appl. No.: 13/120,768

(22) PCT Filed: Sep. 28, 2009

(86) PCT No.: PCT/JP2009/066723
§ 371 (c)(1),
(2), (4) Date: Mar. 24, 2011

(87) PCT Pub. No.: WO2010/035818
PCT Pub. Date: Apr. 1, 2010

(65) Prior Publication Data
US 2011/0182566 A1  Jul. 28, 2011

(30) Foreign Application Priority Data

Sep. 29, 2008 (JP) .................................. 2008-251278
Sep. 30, 2008 (JP) .................................. 2008-254523

(51) Int. Cl.
*G03B 17/00* (2006.01)
(52) U.S. Cl. ....................................................... 396/55
(58) Field of Classification Search ................ 396/55
See application file for complete search history.

(56) References Cited

U.S. PATENT DOCUMENTS

| 7,539,404 | B2 * | 5/2009 | Iwasaki et al. | 396/55 |
|---|---|---|---|---|
| 7,630,619 | B2 * | 12/2009 | Masuda | 396/55 |
| 8,019,210 | B2 * | 9/2011 | Uno et al. | 396/55 |
| 8,073,317 | B2 * | 12/2011 | Kitano | 396/55 |

(Continued)

FOREIGN PATENT DOCUMENTS

| JP | 2002-268108 | 9/2002 |
|---|---|---|
| JP | 2003-233098 | 8/2003 |

(Continued)

OTHER PUBLICATIONS

International Search Report issued Oct. 27, 2009 in International (PCT) Application No. PCT/JP2009/066723.

*Primary Examiner* — Rodney Fuller
(74) *Attorney, Agent, or Firm* — Wenderoth, Lind & Ponack, L.L.P.

(57) ABSTRACT

An image blur correction device includes: a tabular base (100) having an opening portion (101) opened in an optical axis direction; a tabular movable holding member (110) configured to hold a lens and supported to be movable within a plane vertical to an optical axis of the lens; a first drive mechanism (130) including a first magnet and a first coil so as to drive the movable holding member in a first direction vertical to the optical axis; a second drive mechanism (140) including a second magnet and a second coil so as to drive the movable holding member in a second direction vertical to the optical axis; and a detecting device (170, 180) for detecting a position of the movable holding member. The first drive mechanism and the second drive mechanism are arranged at positions that are line-symmetric with respect to a first straight line (S1) perpendicular to the optical axis of the lens.

11 Claims, 19 Drawing Sheets

U.S. PATENT DOCUMENTS

| | | | |
|---|---|---|---|
| 2007/0212046 A1* | 9/2007 | Sogoh et al. | 396/55 |
| 2007/0242938 A1* | 10/2007 | Uno et al. | 396/55 |
| 2007/0297781 A1* | 12/2007 | Kitano | 396/55 |
| 2008/0187301 A1* | 8/2008 | Takahashi | 396/55 |
| 2009/0201381 A1* | 8/2009 | Byon et al. | 348/208.11 |
| 2009/0252484 A1* | 10/2009 | Hasuda | 396/55 |

FOREIGN PATENT DOCUMENTS

| | | |
|---|---|---|
| JP | 3740475 | 2/2006 |
| JP | 2007-286318 | 11/2007 |
| JP | 2008-64846 | 3/2008 |
| JP | 2008-203451 | 9/2008 |
| JP | 2008-209435 | 9/2008 |

* cited by examiner

IMAGE BLUR CORRECTION DEVICE, IMAGING LENS UNIT, AND CAMERA UNIT

BACKGROUND OF THE INVENTION

1. Technical Field

The present invention relates to an image blur correction device (image stabilization device) mounted in, e.g., a lens body tube or a shutter unit in a digital camera, and to an imaging lens unit and a camera unit including this image blur correction device, and more particularly to a small and thin image blur correction device (image stabilization device) applied to a camera unit mounted in a personal digital assistance such as a mobile phone, and to an imaging lens unit and a camera unit.

2. Description of the Related Art

As a conventional image blur correction device (image stabilization device), there is known an image blur correction device including: a substantially rectangular base having an opening portion at the center; a first guide shaft provided on a front surface of the base; a first movable member supported to be reciprocable along the first guide shaft; a second guide shaft directed to a 90-degree direction with respect to the first guide shaft and provided on a front surface of the first movable member; a second movable member supported to be reciprocable along the second guide shaft and configured to hold a lens; a first drive device configured to reciprocate the first movable member and the second movable member together in a direction of the first guide shaft; and a second drive device configured to reciprocate the second movable member in a direction of the second guide shaft, the image blur correction device adopting a voice coil motor including a coil and a magnet as each of the first drive device and the second drive device (see, e.g., Japanese Unexamined Patent Application Publication No. 2007-286318, U.S. Patent Application Publication No. 2007/0242938A1, and others).

However, this device adopts a double configuration that the first movable member and the second movable member are aligned in an optical axis direction, thus leading to an increase in size of the device in the optical axis direction.

Further, although the second drive device drives the second movable member alone, the first drive device must drive not only the first movable member but also the second movable member and the second guide shaft at the same time, larger drive force must be generated as compared with a situation where the first movable member alone is driven, thereby resulting in an increase in size of the first drive device. Furthermore, since a drive load of the first drive device is different from a drive load of the second drive device, drive control for positioning the les within a plane vertical to the optical axis is not easy.

Moreover, as another image blur correction device (image stabilization device), there is known an image blur correction device including: a substantially rectangular base having an opening portion; four elastic support members (wires) that are implanted in four corners of a front surface of the base and extend in an optical axis direction; a movable member coupled with ends of the four elastic support member to hold a lens; a first magnet and a first yoke provided to a movable member; a second magnet and a second yoke provided to the movable member; and a substantially rectangular fixed frame that is fixed to a member different from the base and arranged in front of the movable member to hold a first coil and a second coil, the first magnet, the first yoke, and the first coil constituting first driving means, the second magnet, the second yoke, and the second coil constituting second driving means, the first driving means being configured to drive the movable member in a first direction vertical to the optical axis, the second driving means being configured to drive the movable member in a second direction vertical to the optical axis and the first direction (see, e.g., Japanese Unexamined Patent Application Publication No. 2008-64846).

However, in this device, since the movable member is supported on the base by using the four elastic support members (the wires) extending in the optical axis direction and the fixed frame configured to hold the coils is supported in front of the movable member by the other member, the size of the device increases in the optical axis direction, and coupling portions of the four elastic support members are coupled rigidly rather than coupled in a link state, whereby the movable member (the lens) may be possibly not only moved in a plane direction vertical to the optical axis but also inclined with respect to the optical axis. Additionally, although the base is coupled with the movable member, since the fixed frame holding the coils is not integrally coupled, the image blur correction device cannot be configured as a module, its handling is inconvenient, the first magnet and the second magnet of the movable member and the first coil and the second coil of the fixed frame cannot be positioned, respectively, with one member (e.g., the base) being determined as a reference, and assembling the device is troublesome. Further, since (the first magnet and the first yoke of) the first driving means and (the second magnet and the second yoke of) the second driving means are arranged on one side of the movable member alone with respect to the lens, the first driving means and the second driving means exercise drive force to one side of the movable member alone rather than both sides of the lens in a symmetric manner, and they tend to facilitate inclination of the movable member, i.e., inclination of the lens.

Furthermore, as still another image blur correction device (image stabilization device), as shown in FIG. 19, there is known an image blur correction device including: a base 1; a movable member 2 holding a lens G; a plurality of driving means (a coil 3 and others) fixed to the movable member 2; a flexible wiring board 4 including a wiring portion 4a arranged along a front surface of the movable member 2 to configure wirings with respect to, e.g., the coil 3; and others, soldering portions 4b connecting lead portions of the coil 3 being provided on the front surface of the movable member 2 where the lens G is exposed (see, e.g., Japanese Patent Publication No. 3740475).

However, since the soldering portions 4b are assured on the front surface of the movable member 2, a reduction in size (a reduction in width) of the movable member and others are difficult. Moreover, since the soldering portions 4b and the lens G are close to each other, heat of a soldering iron is transferred to the movable member 2 or the lens G at the time of a soldering operation, and the movable member 2 or the lens G may be possibly thermally broken or damaged.

SUMMARY OF THE INVENTION

1. Problem to be Solved by the Invention

In view of the above-described problem, it is an object of the present invention to provide an image blur correction device (image stabilization device) that can be mounted in a camera unit of, e.g., a mobile phone while achieving, e.g., simplification of the structure or a reduction in size and thickness of the device in an optical axis direction of a lens and a direction vertical to the optical axis direction, highly accurately correct an image blur due to hand movement and others, enable easily performing a soldering operation and others, and avoid damages and others due to heat at the time of soldering, and to provide an imaging lens and a camera unit provided with this image blur correction device.

2. Means for Solving the Problem

An image blur correction device according to the present invention includes: a tabular base having an opening portion; a tabular movable holding member that is configured to hold a lens and supported to be movable within a plane vertical to an optical axis of the lens; a first drive mechanism including a first magnet and a first coil so as to drive the movable holding member in a first direction vertical to the optical axis; a second drive mechanism including a second magnet and a second coil so as to drive the movable holding member in a second direction vertical to the optical axis; and a detecting means for detecting a position of the movable holding member, wherein the movable holding member is movably supported to be adjacent to the base, and the first drive mechanism and the second drive mechanism are arranged at positions that are line-symmetric with respect to a first straight line perpendicular to the optical axis of the lens.

According to this configuration, the movable holding member is two-dimensionally moved within the plane vertical to the optical axis with respect to the base by the drive force of the first drive mechanism and the second drive mechanism, thereby highly accurately correcting an image blur caused due to, e.g., hand movement.

Here, since the first drive mechanism and the second drive mechanism can drive the one movable holding member rather than a double configuration and they are arranged to be line-symmetric with respect to the first straight line orthogonal to the optical axis of the lens held by the one movable holding member, drive loads imposed on the respective drive mechanisms are equal to each other, and drive force is exerted to both sides with the lens at the center, thereby stably and smoothly driving the movable holding member within the plane vertical to the optical axis.

Furthermore, since the movable holding member is movably supported to be adjacent to the base, the gap between the movable holding member and the base in the optical axis direction can be narrowed, thus achieving a reduction in thickness of the device in the optical axis direction.

In the above-described configuration, it is possible to adopt a configuration that one of the movable holding member and the base has a plurality of protrusions protruding in an optical axis direction, the other of the movable holding member and the base has a receiving surface configured to slidably receive the protrusions, and an urging spring that urges the protrusions toward the receiving surface is provided to the movable holding member and the base in a tensioned state.

According to this configuration, since the movable holding member and the base are urged by the urging spring and the movable holding member is movably supported with respect to the base by slidably receiving the protrusions formed on one of the movable holding member and the base on the receiving surface formed on the other of the same, the thickness of the device in the optical axis direction can be reduced while attaining simplification of the structure and a reduction in the number of components.

In the above-described configuration, it is possible to adopt a configuration that each of the first coil and the second coil is formed into a substantially elliptic annular shape having a major axis and a minor axis and arranged in such a manner that each center is placed on a second straight line perpendicular to the optical axis of the lens and the first straight line, and the major axis of the first coil and the major axis of the second coil are arranged to form a predetermined inclination angle with respect to the second straight line.

According to this configuration, when the movable holding member has a shape that is elongated in a direction of the second straight line, since a dimension of the movable holding member can be decreased in a direction of the first straight line by inclining the first coil and the second coil, for example, a reduction in size and thickness of the device in the direction vertical to the optical axis can be achieved.

In the above-described configuration, it is possible to adopt a configuration that the movable holding member has a cylindrical portion configured to hold the lens and a flat plate portion extending in a direction of the second straight line from both sides of the cylindrical portion, and the cylindrical portion is inserted in the opening portion of the base in a contactless manner.

According to this configuration, since the movable holding member is arranged in such a manner that its cylindrical portion is inserted in the opening portion of the base and the flat plate portion on both sides adjacently faces the base in the optical axis direction, even in case of holding a plurality of lenses, the movable holding member can be arranged at a position close to the base, thus reducing the thickness of the device in the optical axis direction.

In the above-described configuration, it is possible to adopt a configuration that the first magnet and the second magnet are fixed to the base, and the first coil and the second coil are fixed to the movable holding member.

According to this configuration, since the first coil and the second coil are fixed to the movable holding member that holds the lens, the device can be configured as a module in accordance with specifications when changing, e.g., the number of turns of the first coil and the second coil based on specifications (e.g., the number, a weight, and others) of the lens.

In the above-described configuration, it is possible to adopt a configuration including a flexible wiring board to which the first coil and the second coil are electrically connected, wherein the flexible wiring board includes: a first fixed portion fixed near the first coil and a second fixed portion fixed near the second coil on a main surface of the movable holding member facing the optical axis direction; a common extending portion extending from the first fixed portion and the second fixed portion so as to deviate from a main surface region of the movable holding member; and a first connecting portion connected with the first coil and a second connecting portion connected with the second coil on the extending portion.

According to this configuration, since the flexible wiring board has the common extending portion that is continuous with the two fixed portions and the two connecting portions are provided on this extending portion, a soldering operation can be easily performed at a time on the same side, damages and others caused due to heat at the time of soldering can be avoided, and even an operator who is not very skillful can readily carry out a connecting (soldering) operation.

In the above-described configuration, it is possible to adopt a configuration that each of the first coil and the second coil is formed into a substantially elliptic annular shape with a major axis and a minor axis, these coils are arranged in such a manner that each major axis forms a predetermined inclination angle with respect to the first straight line, and the extending portion of the flexible wiring board is formed to extend in the direction of the first straight line.

According to this configuration, when the movable holding member has the shape that is elongated in the direction of the second straight line orthogonal to the first straight line and the optical axis, the dimension of the movable holding member can be reduced in the direction of the first straight line by inclining the first coil and the second coil and, for example, a reduction in size and thickness of the device in the direction of the first straight line vertical to the optical axis can be achieved by extending and bending the extending portion in the direction of the first straight line.

In the above-described configuration, it is possible to adopt a configuration that the movable holding member has a guide groove through which a lead portion of the first coil and a lead portion of the second coil are led out.

According to this configuration, when the lead portions of the coils are pulled out through the guide groove, a wiring operation can be easily performed, and the components can be put together to achieve a reduction in thickness and size of the device.

In the above-described configuration, it is possible to adopt a configuration that the extending portion of the flexible wiring board is formed to extend in the direction of the first straight line.

According to this configuration, a reduction in size and thickness of the device in the direction of the first straight line vertical to the optical axis and others can be achieved by extending and bending the extending portion in the direction of the first straight line.

In the above-described configuration, it is possible to adopt a configuration that a first yoke configured to form a magnetic circuit in cooperation with the first magnet and the first coil and a second yoke configured to form a magnetic circuit in cooperation with the second magnet and the second coil are fixed to the base.

According to this configuration, when the first yoke and the second yoke are provided to the base, a magnetic efficiency can be enhanced without increasing the drive loads imposed on the first drive mechanism and the second drive mechanism.

In the above-described configuration, it is possible to adopt a configuration that the first yoke is arranged on both sides sandwiching the first magnet and the first coil in the optical axis direction, and the second yoke is arranged on both sides sandwiching the second magnet and the second coil in the optical axis direction.

According to this configuration, since the first yoke and the second yoke are arranged on both the sides in the optical axis direction (or they are arranged on both the sides and the center of each yoke is provided on the second straight line), the magnetic efficiency can be further improved.

Further, an imaging lens unit according to the present invention having a plurality of lenses for imaging is characterized in that the imaging lens unit includes any one of the image blur correction devices having the above-described configuration.

According to this configuration, the correction lens held by the movable holding member is appropriately driven by providing the image blur correction device in the configuration that the plurality of lenses for imaging are arranged in the optical axis direction, thereby smoothly and highly accurately correcting an image blur due to, e.g., hand movement.

That is, it is possible to provide the imaging lens unit additionally having the image blur correcting function in addition to the plurality of lenses for imaging.

Furthermore, a camera unit according to the present invention having an imaging element is characterized in that the camera unit includes any one of the image blur correction devices having the above-described configuration.

According to this configuration, the correction lens held by the movable holding member is appropriately driven by having the image blur correction device in the camera unit including the imaging element, an image blur caused due to, e.g., hand movement can be smoothly and highly accurately corrected, thus obtaining a further excellent captured image by the imaging element.

3. Advantageous Effect of the Invention

According to the image blur correction device having the above-described configuration, it is possible to obtain the image blur correction device that can be applied to the camera unit mounted in, e.g., a mobile phone while achieving, e.g., simplification of the structure or a reduction in size and thickness of the device in the optical axis direction of the lens and the direction vertical to the optical axis direction, that can highly accurately correct an image blur caused due to hand movement and others, enable easily performing a soldering operation and others, and avoid damages and others due to heat at the time of soldering.

EXPLANATIONS OF LETTERS OR NUMERALS

Figure 1:
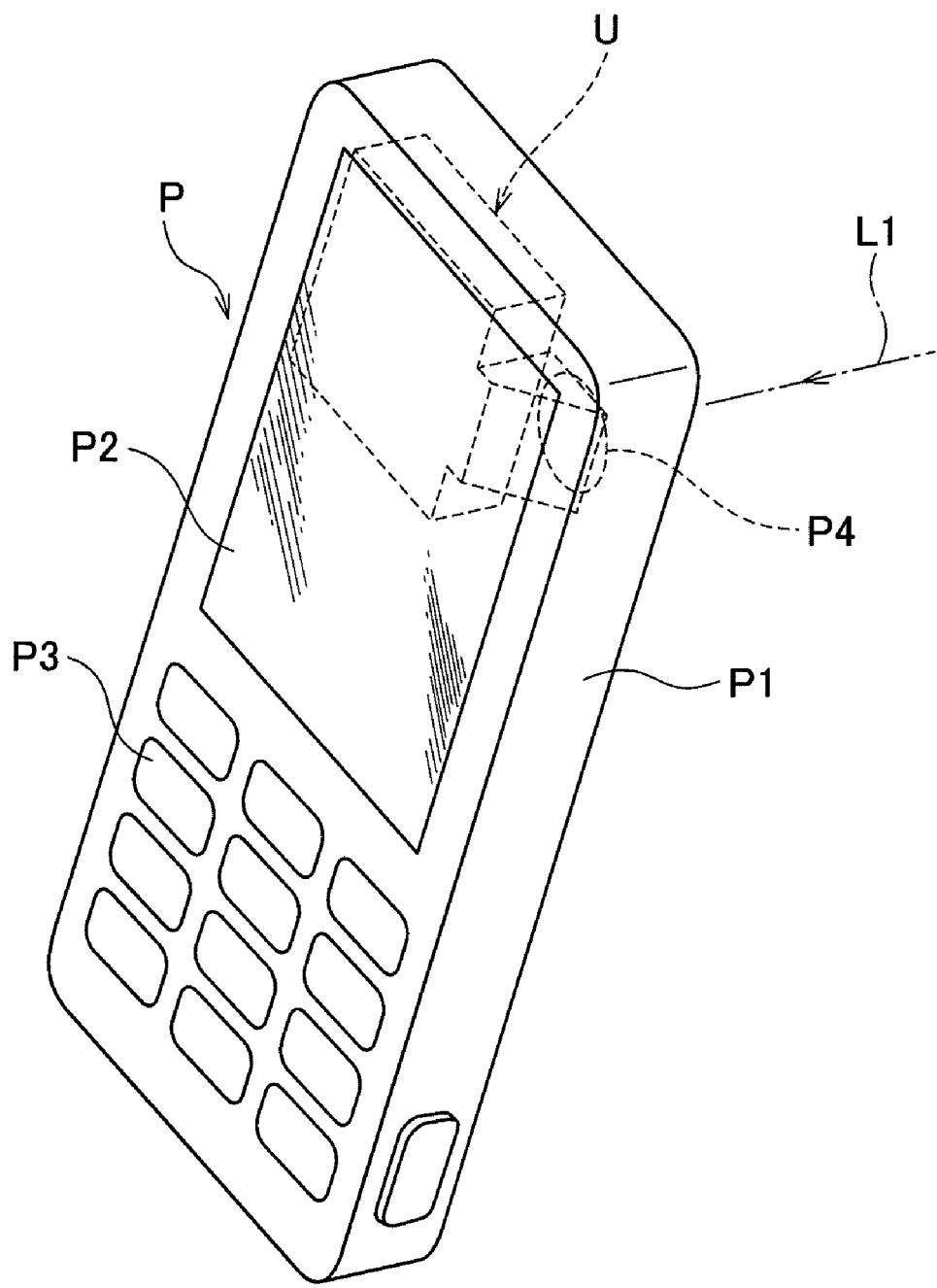
FIG. 1 is a perspective view showing a personal digital assistance in which a camera unit having an image blur correction device according to the present invention incorporated therein is mounted.

L1, L2 optical axis
P personal digital assistance
P1 housing
P2 display unit
P3 operation button
P4 imaging window
U camera unit
10 unit case
11 protruding portion
12, 13, 14, 15 holding portion
20 prism
G1, G2, G3, G4, G5, G6 lens
30 first movable lens group
31 lens holding member
32 guided portion
33 regulated portion
34 U-shaped engagement portion
40 filter
50 CCD
60 first drive unit
61 guide shaft
62 antirotation shaft
63 lead screw
64 motor
65 nut
66 coil spring
70 second drive unit
71 guide shaft
72 antirotation shaft
73 lead screw
74 motor
75 nut
76 coil spring
80 control system
81 microcomputer
82, 83 motor drive circuit
84 CCD drive circuit
85 drive circuit
86 position detection circuit
87 angular velocity detection circuit
M image blur correction device
S1 first straight line
S2 second straight line
S3 straight line
S3' straight line (second direction)
S4 straight line
S4' straight line (first direction)
100, 100' base
101, 101' opening portion
101a' convex flat portion
102, 102', 103, 103' fitting hole
104 guided portion
105 regulated portion
106 U-shaped engagement portion
107 latch portion
108 receiving surface
110, 110', 110" movable holding member
F1 main surface
F2 side surface
110a, 110a' cylindrical portion
110a" circular portion
111 flat plate portion
112, 113, 114, 115 fitting hole
117 latch portion
118, 118' protrusion
119 guide groove
120 urging spring
130 first drive mechanism
131 first magnet
132 first coil
132a, 132b lead portion
133, 134 first yoke
140 second drive mechanism
141 second magnet
142 second coil
142a, 142b lead portion
143, 144 second yoke
150 flexible wiring board
151 first fixed portion
152 second fixed portion
153 extending portion
154a, 154b first connecting portion
155a, 155b second connecting portion
160 yoke holding member
161 opening portion
162, 163 fitting hole
170 first position sensor (detecting means)
180 second position sensor (detecting means)

DETAILED DESCRIPTION OF THE INVENTION

As shown in FIG. 1, a camera unit U having an image blur correction device (image stabilization device) incorporated therein is mounted in a flat and small personal digital assistance P. The personal digital assistance P includes a housing P1 having a substantially rectangular and flat outline form, a display unit P2 such as a liquid crystal panel that is arranged on a surface of the housing P1 and displays various kinds of information, operation buttons P3, an imaging window P4 formed on a surface of on the opposite side of the display unit P2, and others. Further, as shown in FIG. 1, the camera unit U is accommodated in the housing P1 so as to extend in a direction vertical to an optical axis L1 of subject light that enters from the imaging window P4.

Figure 2:
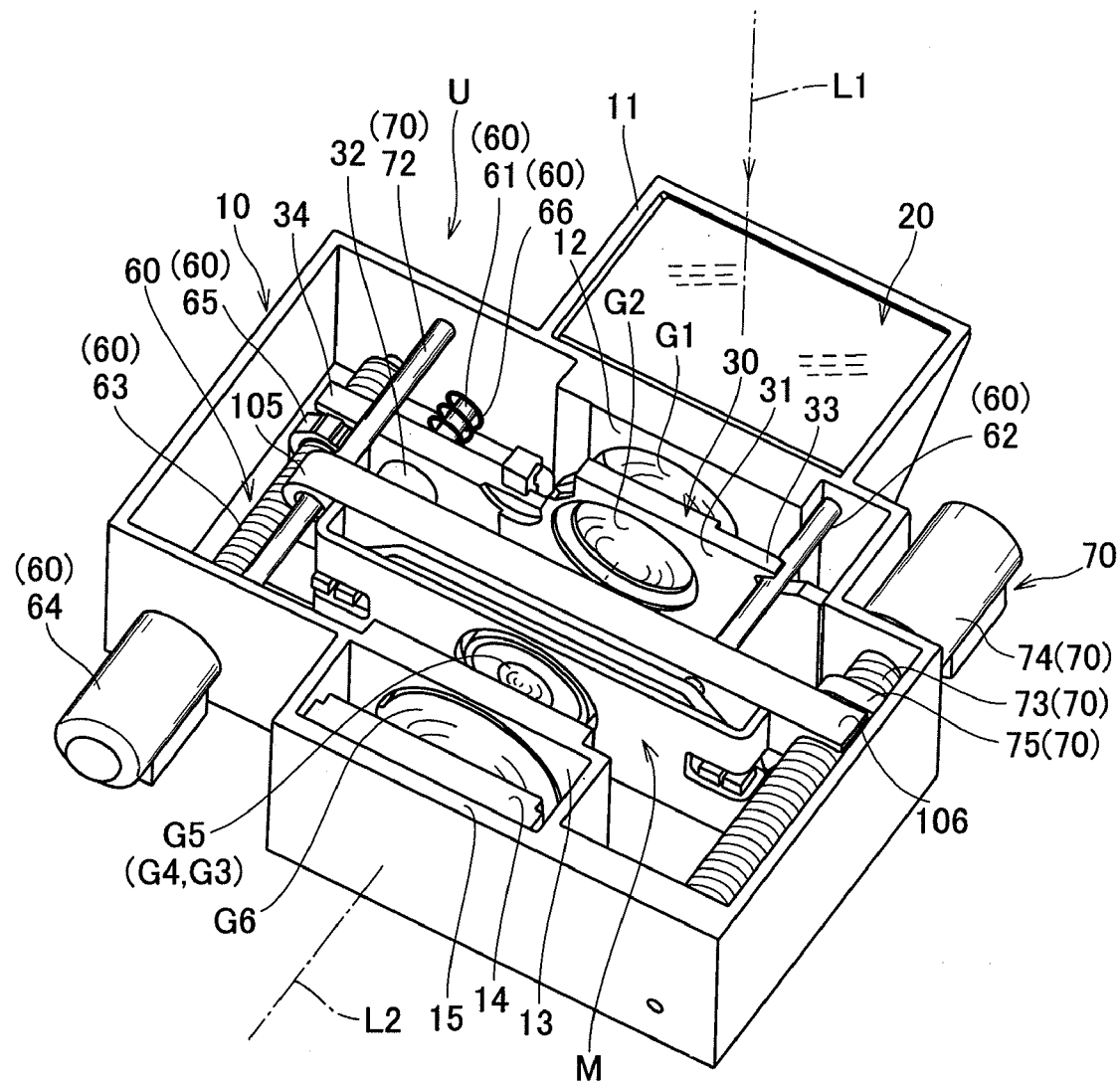
FIG. 2 is a perspective view showing the camera unit.
Figure 3:
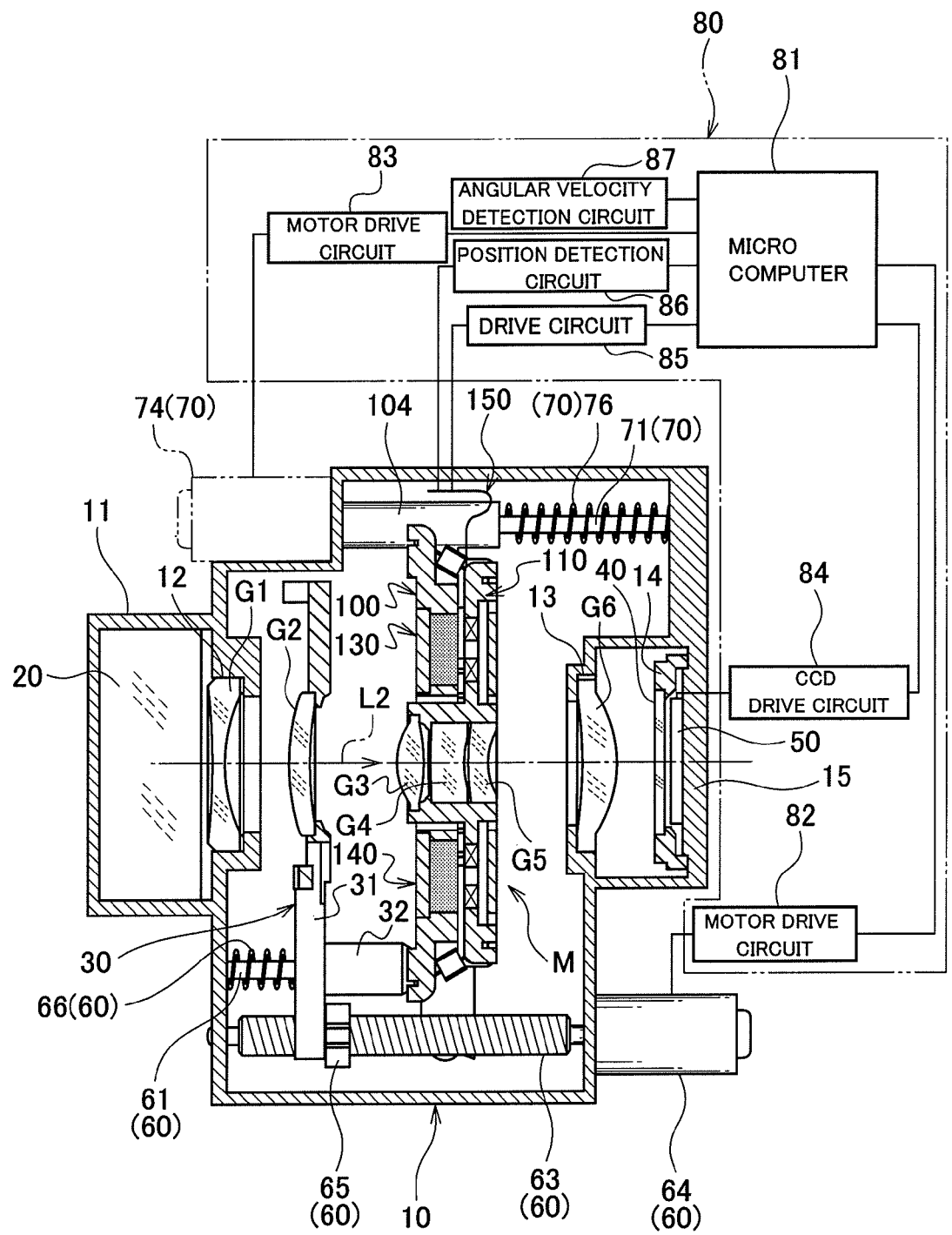
FIG. 3 is a system chart of the camera unit.

As shown in FIG. 2 and FIG. 3, the camera unit U includes: a unit case 10; a prism 20; a first movable lens group 30 holding a lens G1 and a lens G2; an image blur correction device M as a second movable lens group holding lenses G3, G4, and G5; a lens G6; a filter 40; a CCD 50 as an imaging element; a first drive unit 60 configured to drive the first movable lens group 30 in an optical axis direction L2; a second drive unit 70 configured to drive the second movable lens group (the image blur correction device M); a control system 80; and others.

As shown in FIG. 2, the unit case 10 is formed into a flat and substantially rectangular shape in such a manner that a thickness dimension in the optical axis direction L1 is small and a length dimension in the optical axis direction L2 becomes small, and it includes a protruding portion 11 configured to fix the prism 20, a holding portion 12 configured to hold the lens G1, a holding portion 13 configured to hold the lens G6, a holding portion 14 configured to hold the filter 40, a holding portion 15 configured to hold the CCD 50, and others.

As shown in FIG. 2 and FIG. 3, the prism 20 is accommodated in the protruding portion 11 of the unit case 10 and bends the optical axis L1 of the subject light entering from the imaging window P4 at a right angle to be led in the optical axis direction L2.

As shown in FIG. 2 and FIG. 3, the lens G1 is arranged at the rear of the prism 20 in the optical axis directions L1 and L2 and fixed to the holding portion 12 of the unit case 10.

As shown in FIG. 2 and FIG. 3, the first movable lens group 30 is arranged at the rear of the lens G1 in the optical axis direction L2, supported to be movable in the optical axis direction L2, and driven to reciprocate in the optical axis direction L2 by the first drive unit 60.

That is, the first movable lens group 30 includes a lens holding member 31, a guided portion 32 guided by a guide shaft 61, a regulated portion 33 that is slidably engaged with an antirotation shaft 62 to regulate its rotation on the optical axis L2, a U-shaped engagement portion 34 with which a nut 65 having a lead screw 63 screwed therein comes into contact, and others.

As shown in FIG. 2 and FIG. 3, the lens G6 is arranged at the rear of the second movable lens group (the image blur correction device M) in the optical axis direction L2 and fixed to the holding portion 13 of the unit case 10.

The filter 40 is, e.g., an infrared cut filter or a low-pass filter, and it is arranged at the rear of the lens G6 in the optical axis direction L2 and fixed to the holding portion 14 of the unit case 10 as shown in FIG. 2 and FIG. 3.

As shown in FIG. 2 and FIG. 3, the CCD 50 is arranged at the rear of the filter 40 in the optical axis direction L2 and fixed to the holding portion 15 of the unit case 10.

As shown in FIG. 2 and FIG. 3, the first drive unit 60 includes the guide shaft 61 and the antirotation shaft 62 that extend in the optical axis direction L2 and are fixed to the unit case 10, the lead screw 63 that extends in the optical axis direction L2, a motor 64 that drives the lead screw 63 to rotate, the nut 65 that has the lead screw 63 screwed therein and comes into contact with the U-shaped engagement portion 34 of the first movable lens group 30, a coil spring 66 that exercises urging force to constantly urge the U-shaped engagement portion 34 toward the nut 64, and others.

As shown in FIG. 2 and FIG. 3, the second drive unit 70 includes a guide shaft 71 and an antirotation shaft 72 that extend in the optical axis direction L2 and are fixed to the unit case 10, a lead screw 73 that extends in the optical axis direction L2, a motor 74 that drives the lead screw 73 to rotate, a nut 75 that has the lead screw 73 screwed therein and comes into contact with the U-shaped engagement portion 106 of the base 100 included in the second movable lens group, a coil spring 76 that exercises urging force to constantly urge the U-shaped engagement portion 106 toward the nut 74, and others.

As shown in FIG. 3, the control system 80 includes a microcomputer 81 that carries out arithmetic processing and processes various signals to generate an instruction signal, a motor drive circuit 82 that drives the motor 64 of the first drive unit 60, a motor drive circuit 83 that drives the motor 74 of the second drive unit 70, a CCD drive circuit 84 that drives the CCD 50, a drive circuit 85 that drives a first drive mechanism 130 and a second drive mechanism 140 included in the image blur correction device M, a position detection circuit 86 connected to a first position sensor 170 and a second position sensor 180 configured to detect a position of the movable holding member 110 included in the image blur correction device M, an angular velocity detection circuit 87 configured to detect vibration or movement undergone by the camera unit U, and others.

Figure 4:
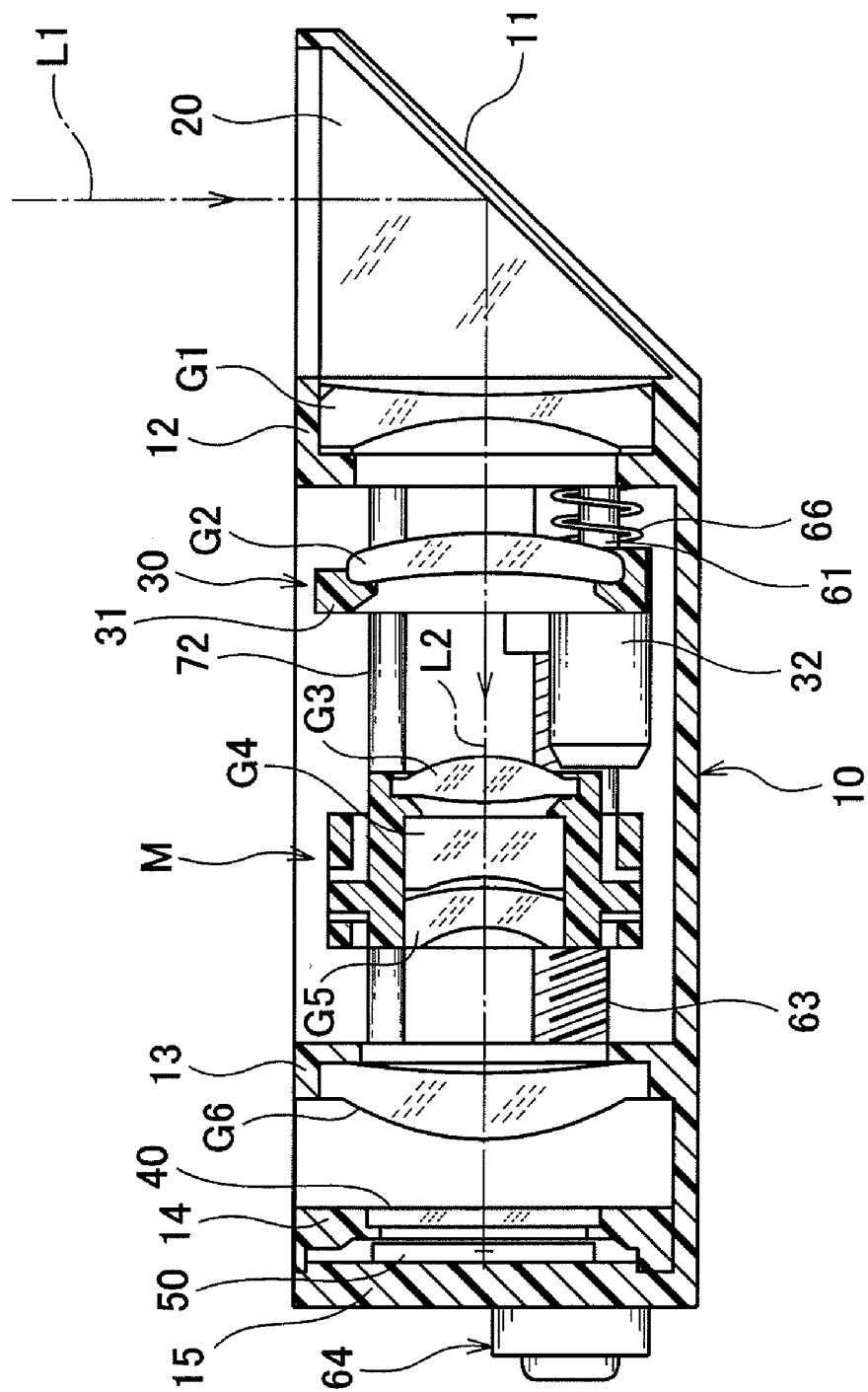
FIG. 4 a cross-sectional view of the camera unit.

As shown in FIG. 2 to FIG. 4, the image blur correction device M as the second movable lens group is arranged between the first movable lens group 30 and the lens G6 in the optical axis direction L2 and supported to be movable in the optical axis direction L2.

Figure 5:
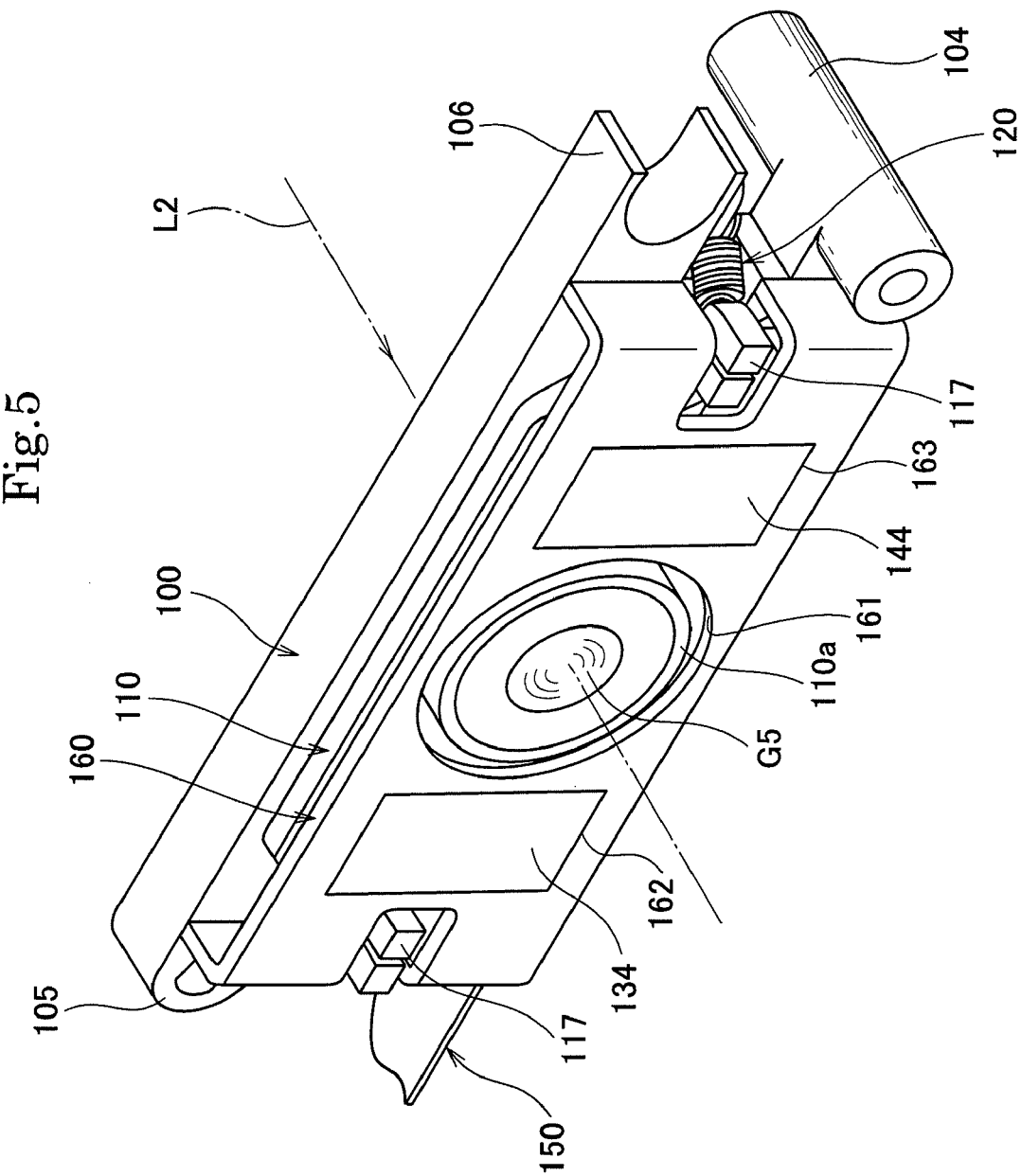
FIG. 5 is a perspective view of the image blur correction device.
Figure 6:
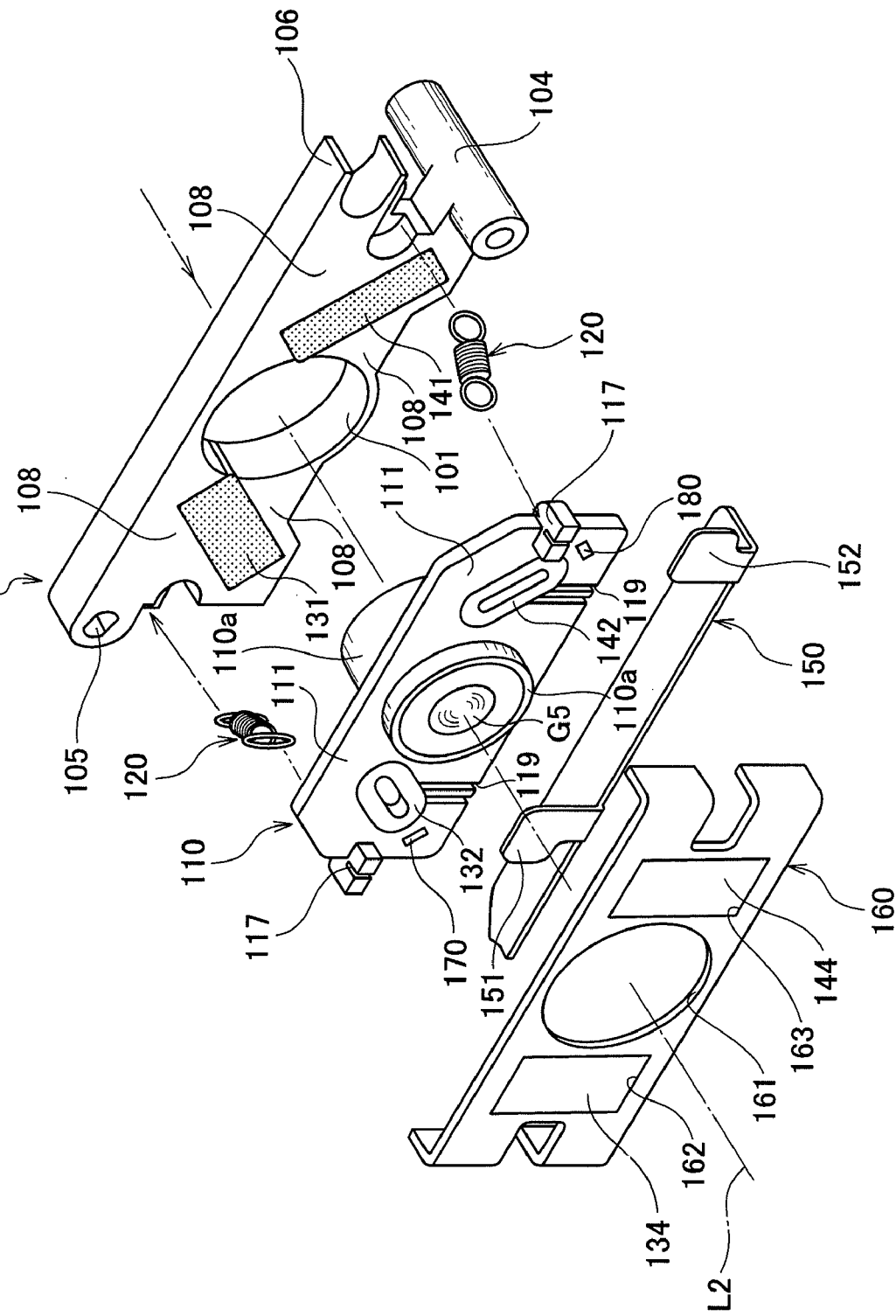
FIG. 6 is an exploded perspective view of the image blur correction device.
Figure 7:
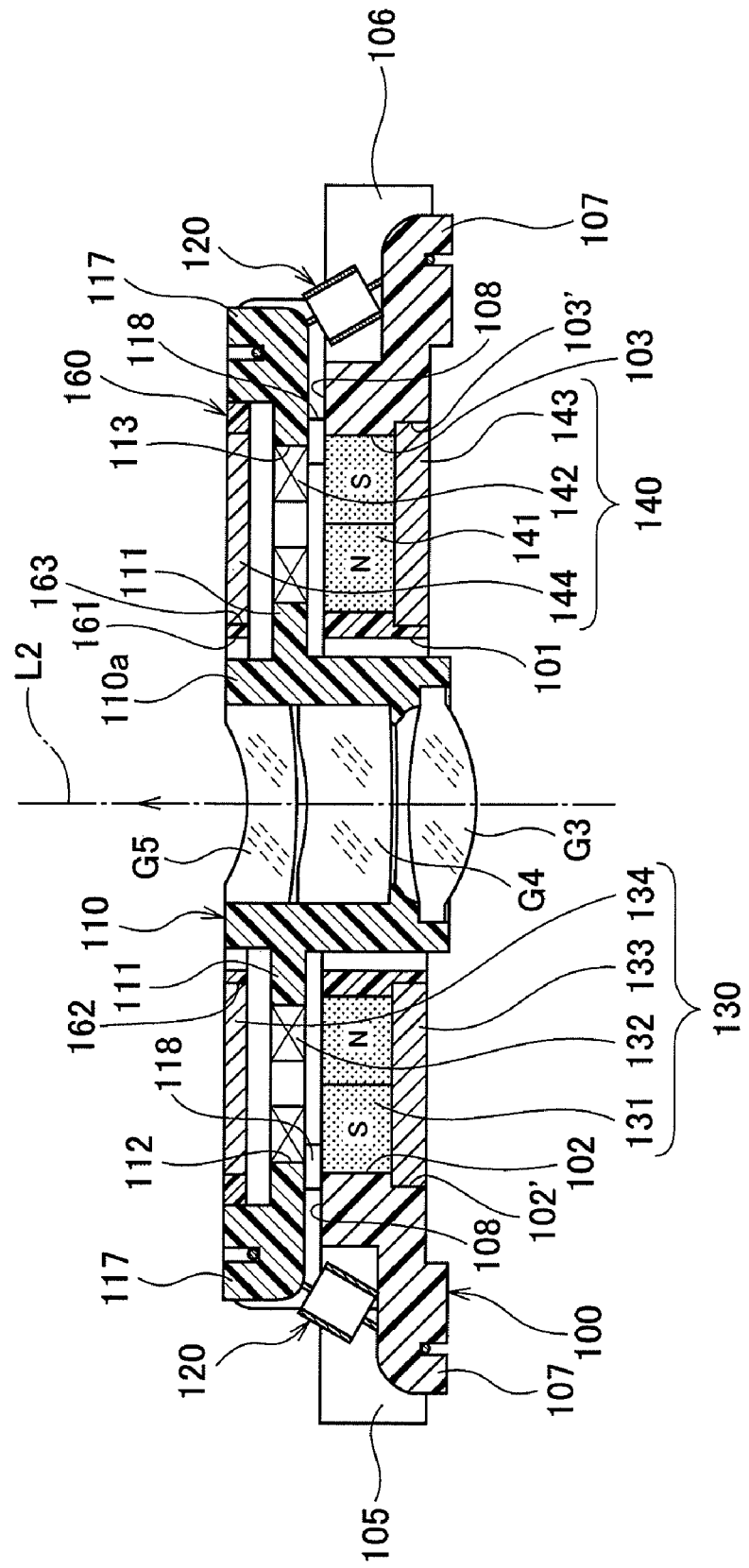
FIG. 7 is a cross-sectional view of the image blur correction device.
Figure 8:
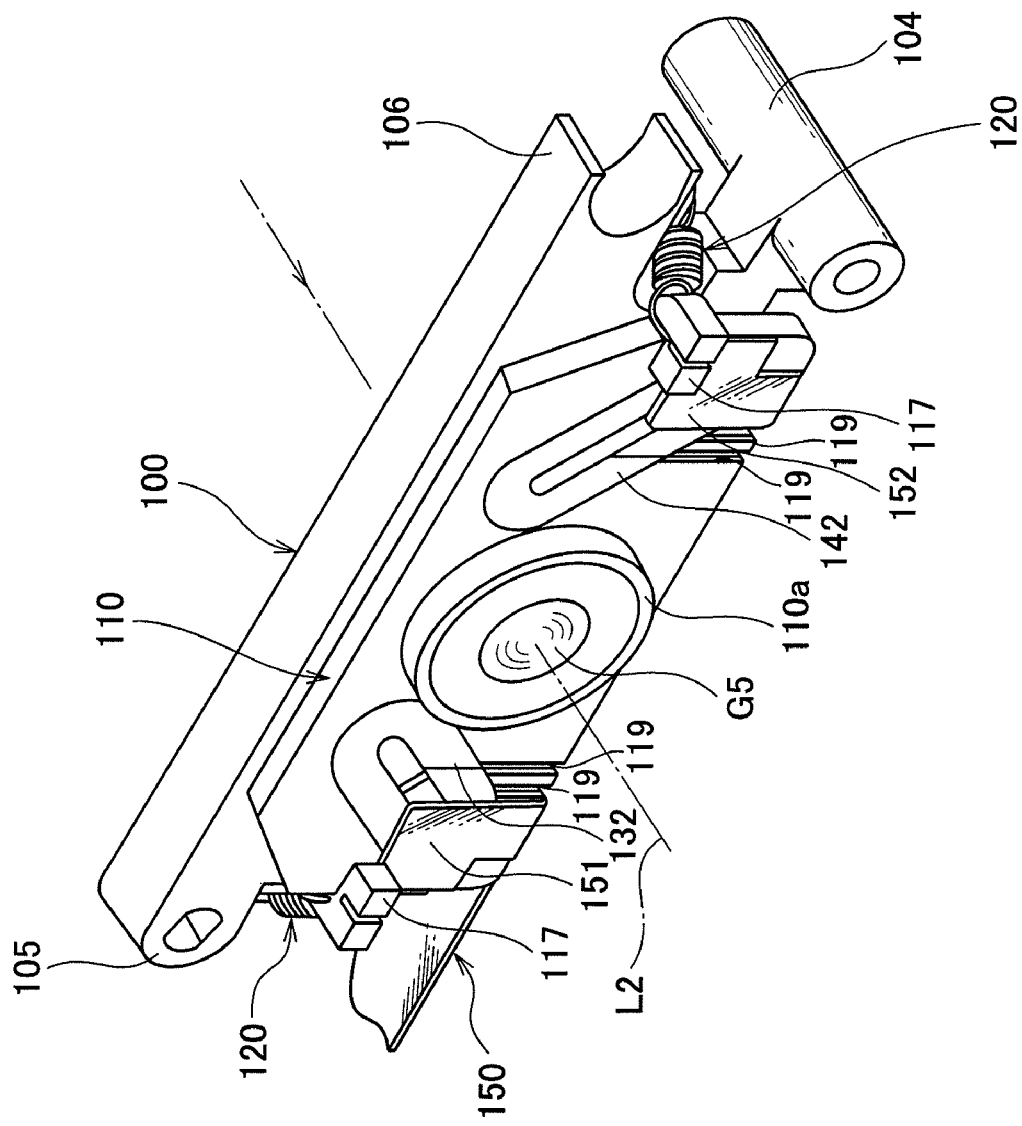
FIG. 8 is a perspective view in which a part (a yoke holding member) of the image blur correction device is omitted.

Furthermore, as shown in FIG. 5 to FIG. 7, the image blur correction device M includes: a base 100; a movable holding member 110; an urging spring 120; the first drive mechanism 130 including a first magnet 131, a first coil 132, and first yokes 133 and 134; the second drive mechanism 140 including a second magnet 141, a second coil 142, and second yokes 143 and 144; a flexible wiring board 150; a yoke holding member 160 that is coupled with the base 100 to function as a part of the base and holds the yokes; the first position sensor 170 and the second position sensor 180 as detecting means; and others.

Figure 10:
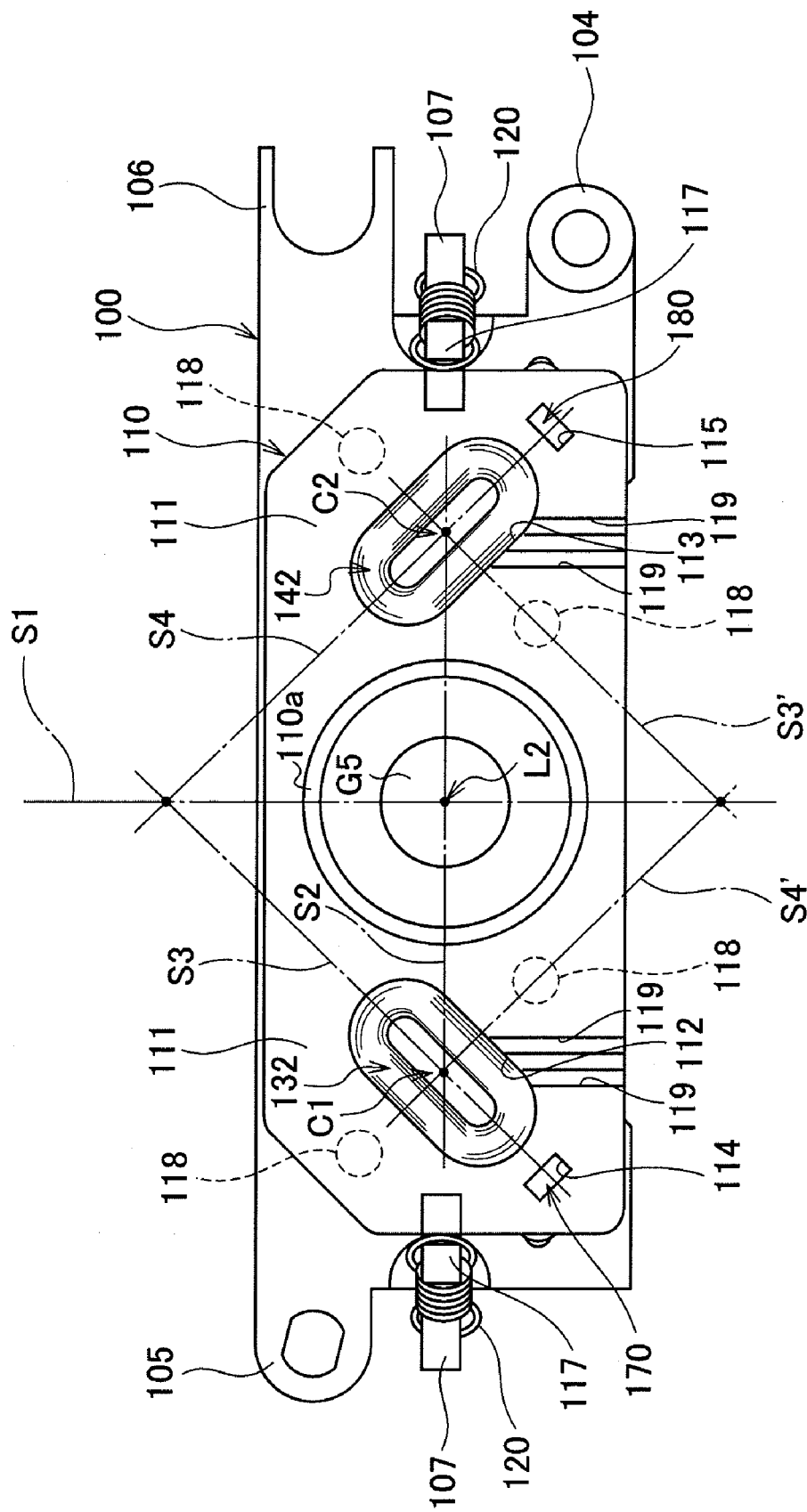
FIG. 10 is a plan view in which a part (the yoke holding member and the flexible wiring board) of the image blur correction device is omitted.
Figure 12:
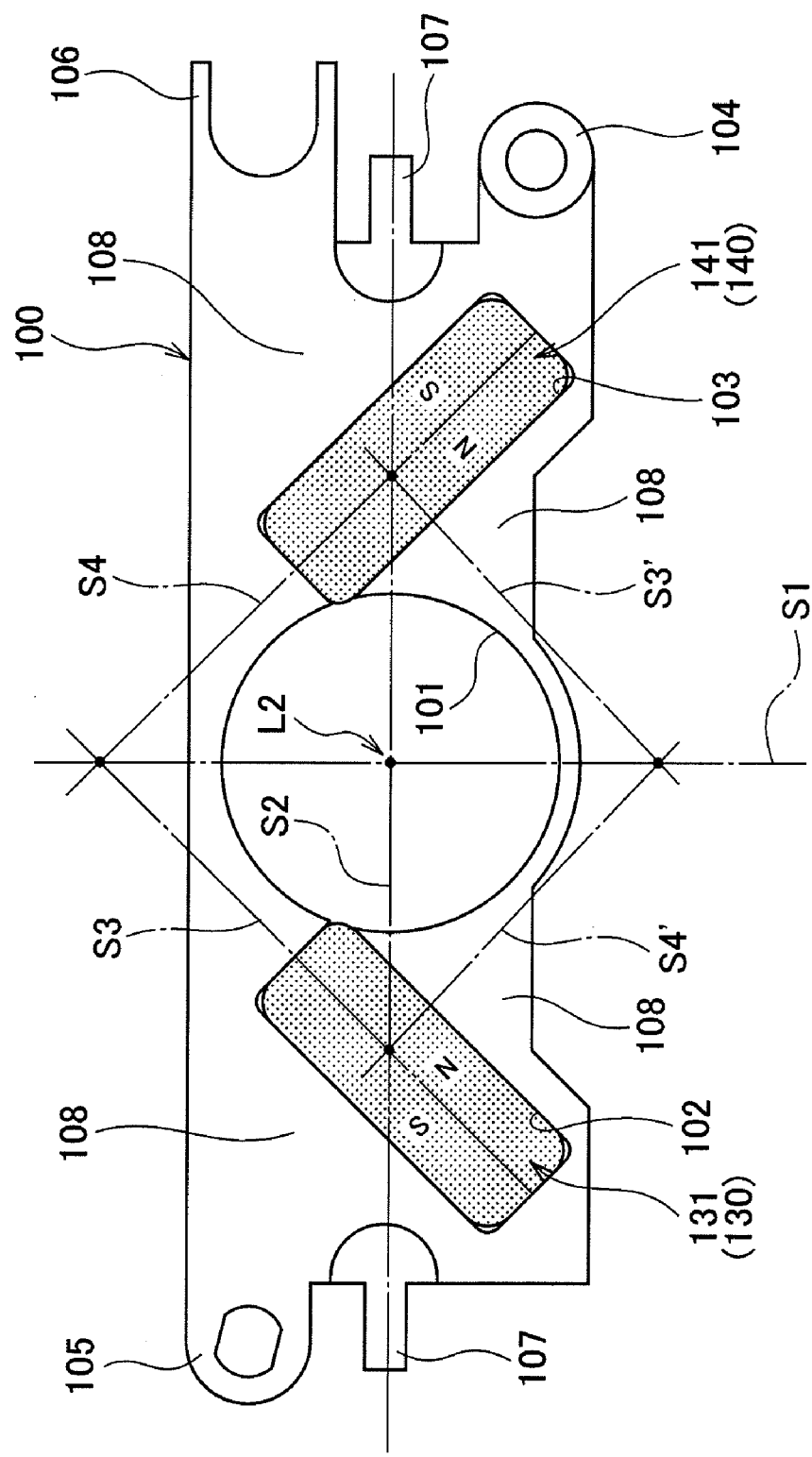
FIG. 12 is a plan view of the base included in the image blur correction device.

As shown in FIG. 7, FIG. 10, and FIG. 12, the base 100 is formed into a substantially rectangular flat plate-like shape that is narrow in a direction of a first straight line S1 perpendicular to the optical axis L2 and parallel to the optical axis L1 and long in a direction of a second straight line S2 perpendicular to the optical axis L2 and the first straight line S1, and it includes a circular opening portion 101 with the optical axis L2 at the center, a fitting hole 102 in which the first magnet 131 is fitted and fixed and a fitting hole 102' in which the first yoke 133 is fitted and fixed, a fitting hole 103 in which the second magnet 141 is fitted and fixed and a fitting hole 103' in which the second yoke 143 is fitted and fixed, a guided portion 104 that is slidably engaged with and guided by the guide shaft 71, a regulated portion 105 that is slidably engaged with the antirotation shaft 72 to regulate its rotation on the optical axis L2, the U-shaped engagement portion 106 with which the nut 75 having the lead screw 73 screwed therein comes into contact, two latch portions 107 that latch and hold one end portion of the urging spring 120, a flat receiving surface 108 that slidably receives four protrusions 118 formed on the movable holding member 110, and others.

The opening portion 101 is formed with an inner diameter dimension that allows a cylindrical portion 110a to pass therethrough in a contactless manner in the range that the movable holding member 110 is driven.

As shown in FIG. 12, the fitting hole 102 (and the fitting hole 102') is formed into a substantially rectangular shape that is long in a direction of a straight line S3 forming 45 degrees with the second straight line S2 and narrow in a direction of a straight line S4' vertical to the straight line S3.

As shown in FIG. 12, the fitting hole 103 (and the fitting hole 103') is formed into a substantially rectangular shape that is long in the direction of the straight line S4' forming 45 degrees with the second straight line S2 and narrow in a direction of a straight line S3' vertical to the straight line S4.

Moreover, as shown in FIG. 12, the fitting hole 102 (and the fitting hole 102') and the fitting hole 103 (and the fitting hole 103') are formed to be line-symmetric with respect to the first straight line S1.

That is, a pair of the first magnet 131 and the first yoke 133 and a pair of the second magnet 141 and the second yoke 143 are arranged to be line-symmetric with respect to the first straight line S1 on the base 100.

Figure 13:
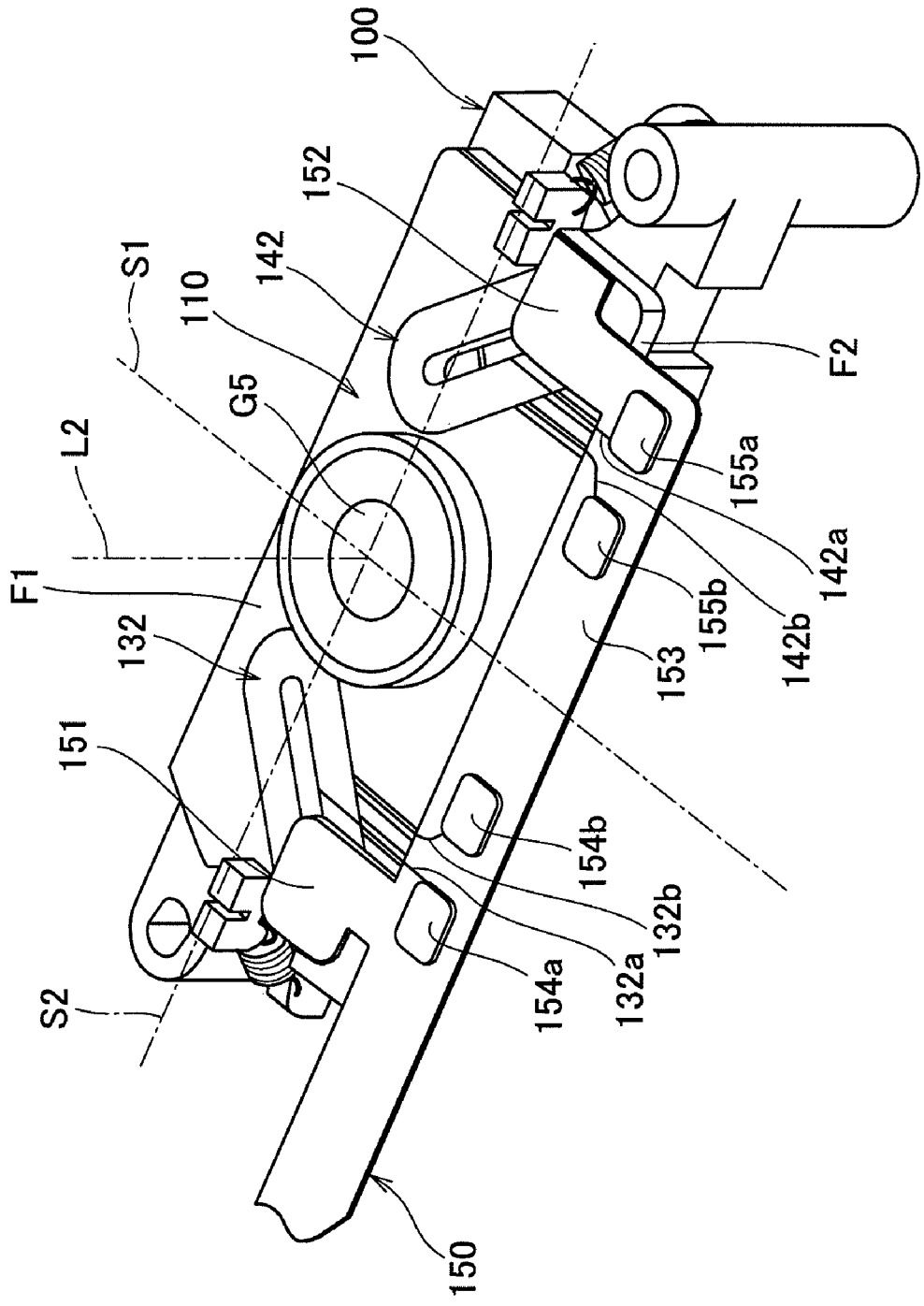
FIG. 13 is a perspective view showing assembling of the flexible wiring board included in the image blur correction device.
Figure 14:
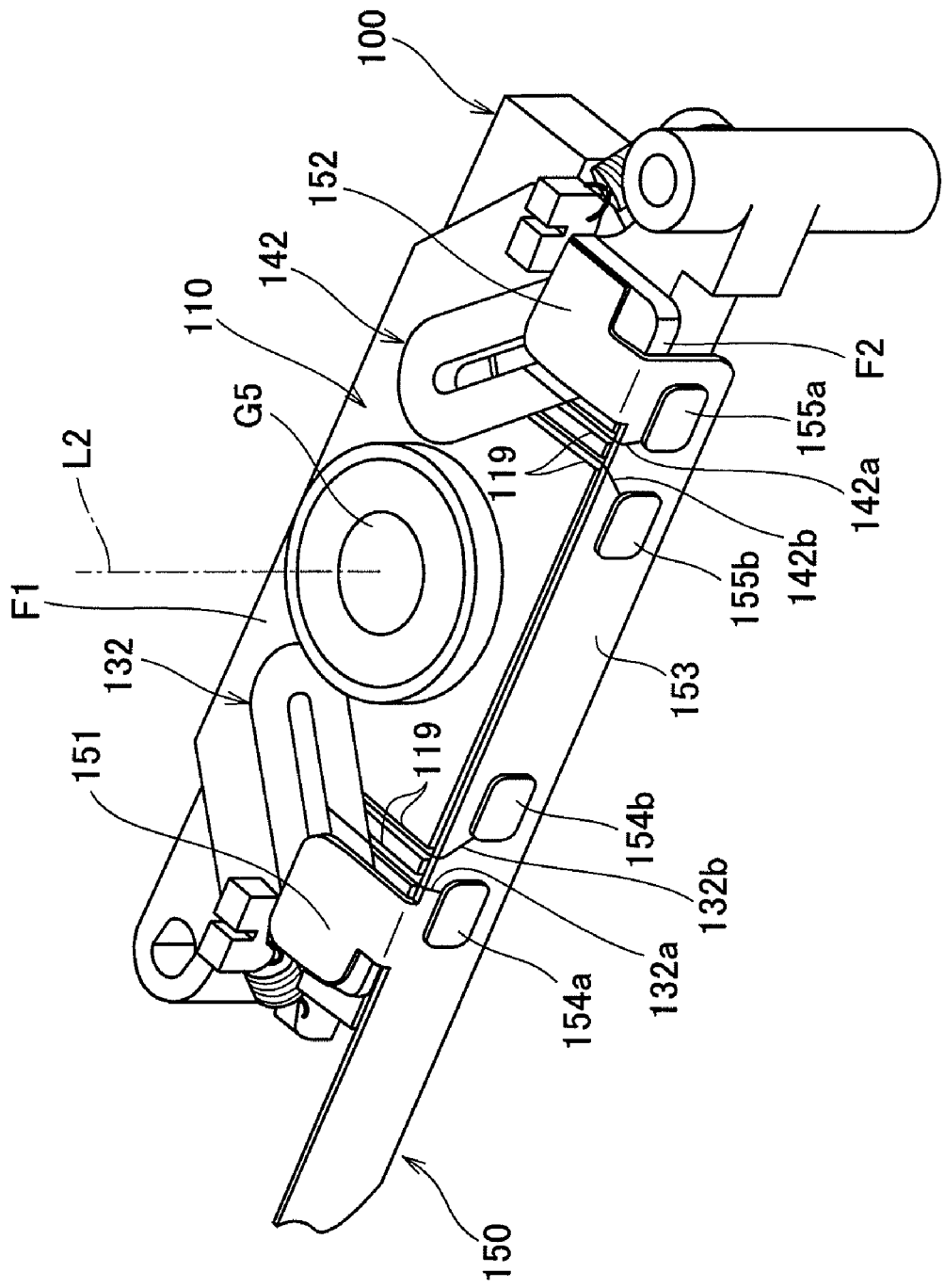
FIG. 14 is a perspective view showing soldering of the flexible wiring board included in the image blur correction device.

As shown in FIG. 6 to FIG. 11, the movable holding member 110 is formed into a substantially rectangular flat plate-like shape that is narrow in the direction of the first straight line S1 that is perpendicular to the optical axis L2 and parallel to the optical axis L1 and long in the direction of the straight line S2 perpendicular to the optical axis L2 and the first straight line S1, and it includes a circular cylindrical portion 110a with the optical axis L2 at the center, a flat plate portion 111 extending to both sides of the direction of the second straight line S2 to sandwich the cylindrical portion 110a, a fitting hole 112 in which the first coil 132 is fitted and fixed, a fitting hole 113 in which the second coil 142 is fitted and fixed, a fitting hole 114 in which the first position sensor 170 is fitted and fixed, a fitting hole 115 in which the second position sensor 180 is fitted and fixed, two latch portions 117 that latch and hold one end portion of the urging spring 120, the four protrusions 118 that come into contact with (the receiving surface 108 of) the base 100, a guide groove 119 through which the lead portions 132a, 132b, 142a, and 142b of the first coil 132 and the second coil 142 are led out, and others. Additionally, as shown in FIG. 13 and FIG. 14, the movable holding member 110 defines a main surface F1 that faces the direction of the optical axis L2 and a side surface F2 that is vertical to the main surface F1 and faces the direction of the first straight line S1.

Figure 11:
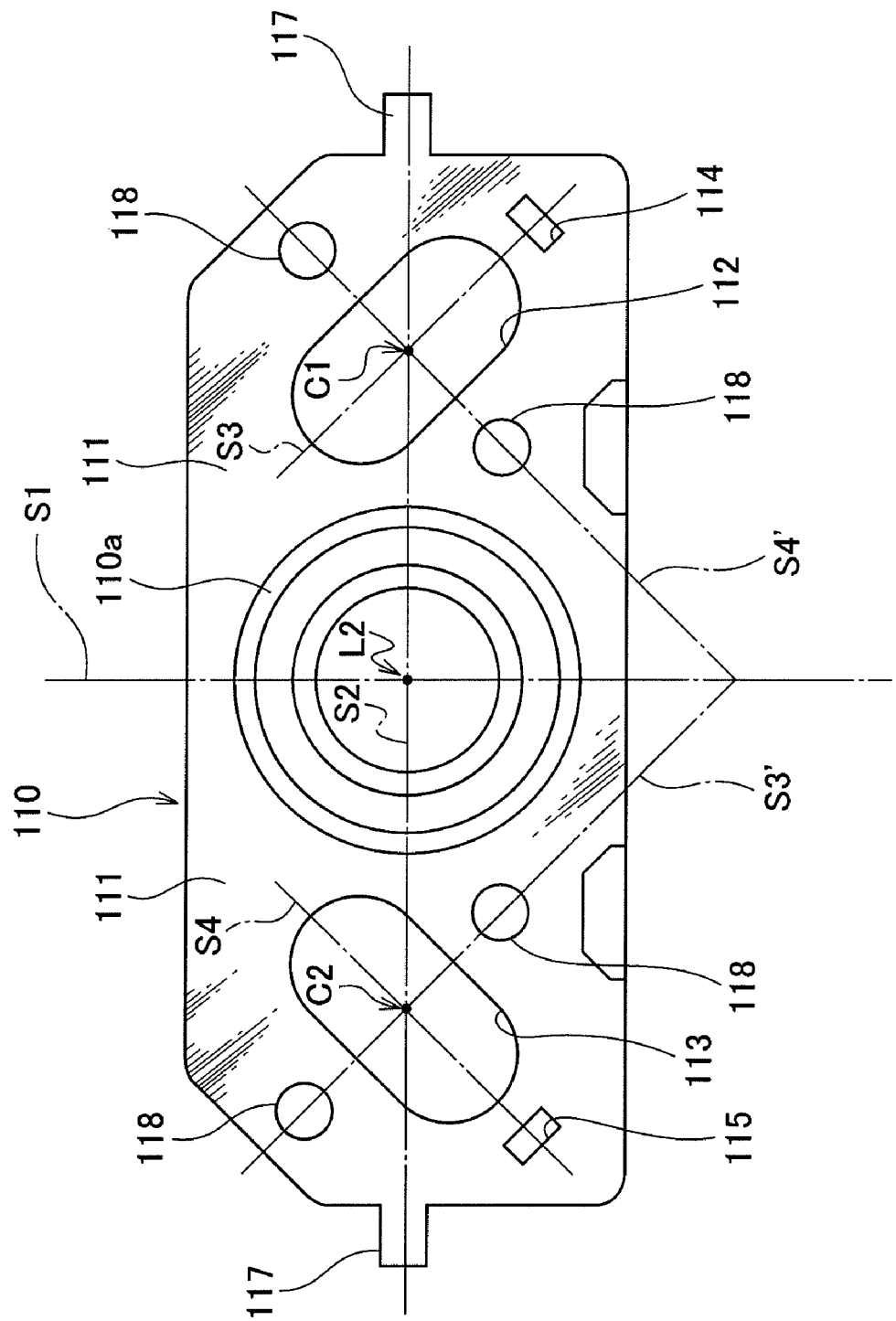
FIG. 11 is a view showing a surface of a movable holding member on a side facing a base included in the image blur correction device.

As shown in FIG. 10 and FIG. 11, the fitting hole 112 (and the fitting hole 114) is formed into a substantially rectangular shape that is long in the direction of the straight line S3 forming 45 degrees with the second straight line S2 and narrow in the direction of the straight line S4' vertical to the straight line S3.

As shown in FIG. 10 and FIG. 11, the fitting hole 113 (and the fitting hole 115) is formed into a substantially rectangular shape that is long in the direction of the straight line S4 forming 45 degrees with the second straight line S2 and narrow in the direction of the straight line S3' vertical to the straight line S4.

Further, the fitting hole 112 (and the fitting hole 114) and the fitting hole 113 (and the fitting hole 115) are formed to be line-symmetric with respect to the first straight line S1 as shown in FIG. 10 and FIG. 11.

That is, a pair of the first coil 132 and the first position sensor 170 and a pair of the second coil 142 and the second position sensor 180 are arranged to be line-symmetric with respect to the first straight line S1 on the movable holding member 110.

The four protrusions 118 are formed to substantially cylindrically protrude toward the base 100 side in the optical axis direction L2 and slidably come into contact with the receiving surface 108 of the base 100, and a protruding height of each protrusion is set small so that (the flat plate portion 111 of) the movable holding member 110 is arranged to be adjacent to the base 100.

Further, as shown in FIG. 11, the two protrusions 118 formed around the fitting hole 112 are arranged to be line-symmetric with respect to the straight line S3, and the two protrusions 118 formed around the fitting hole 113 are arranged to be line-symmetric with respect to the straight line S4.

As described above, the movable holding member 110 and the base 100 are urged by the urging spring 120, and the protrusions 118 slidably come into contact with the receiving surface 108 to be supported, whereby a thickness of the device in the optical axis direction L2 can be reduced while achieving simplification of the structure and a decrease in the number of components.

As shown in FIG. 7, each urging spring 120 is a tension type coil spring, and one end portion thereof is latched on and held by the latch portion 107 of the base 100 while the other end portion thereof is latched on and held by the latch portion 117 of the movable holding member 110. Furthermore, these springs are stretched in such a manner that the protrusions 118 can be constantly slidably in contact with the receiving surface 108.

As shown in FIG. 5 to FIG. 7, the yoke holding member 160 is arranged to sandwich the movable holding member 110 in the optical axis direction L2 and fixed to the base 100 to function as a part of the base, and it includes a circular opening portion 161 formed at the center, a fitting hole 162 in which the first yoke 134 is fitted and a fitting hole 163 in which the second yoke 144 is fitted on both sides of the opening portion 161, and others.

The opening portion 161 is formed with an inner diameter dimension that allows the cylindrical portion 110a to pass therethrough in a contactless manner in the range that the movable holding member 110 is driven.

As shown in FIG. 7, the first drive mechanism 130 is formed as a voice coil motor including the first magnet 131, the first coil 132, and the first yokes 133 and 134.

As shown in FIG. 12, the first magnet 131 is formed into a rectangular shape that is long in the direction of the straight line S3, and it is fitted and fixed in the fitting hole 102 of the base 100. Further, the first magnet 131 is magnetized to have an N pole and an S pole with a surface running through the straight line S3 as a border.

Figure 9:
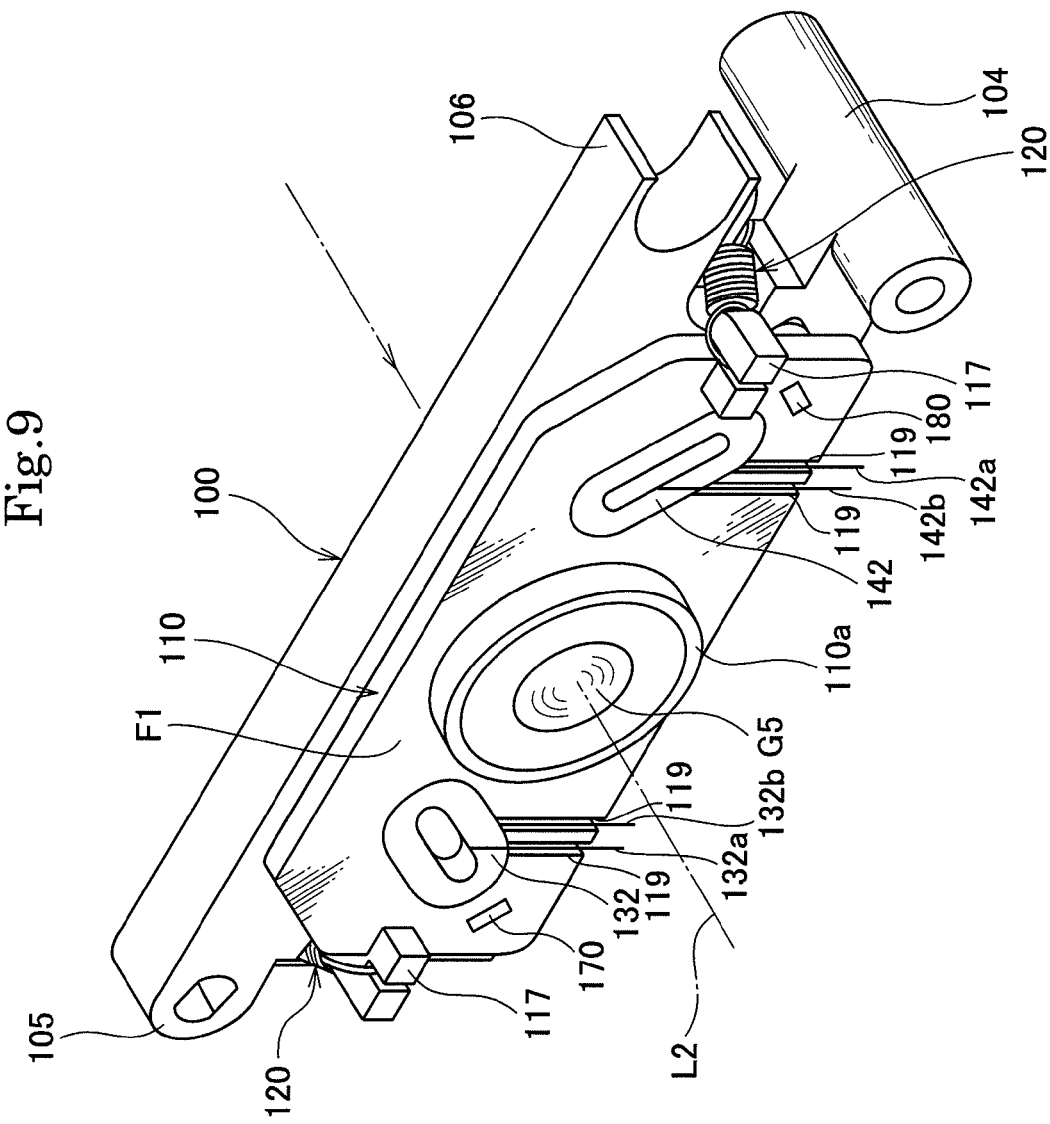
FIG. 9 is a perspective view in which a part (the yoke holding member and a flexible wiring board) of the image blur correction device is omitted.

As shown in FIG. 10, the first coil 132 is formed into a substantially elliptic annular shape having a major axis in the direction of the straight line S3 and a minor axis in the direction of the straight line S4', and it is fitted and fixed in the fitting hole 112 of the movable holding member 110. Furthermore, the first coil 132 is arranged in such a manner that its center C1 is placed on the second straight line S2 and its major axis forms an inclination angle of 45 degrees with respect to the second straight line S2. Moreover, as shown in FIG. 9, FIG. 13, and FIG. 14, the first coil 132 has lead portions 132a and 132b inserted into and led out from the guide groove 119 of the movable holding member 110.

The first yoke 133 is formed into a rectangular shape that has an area equal to or above that of the first magnet 131 with being in contact with the first magnet 131 and is long in the direction of the straight line S3, and it is fitted and fixed in the fitting hole 102' of the base 100 as shown in FIG. 7.

The first yoke 134 is formed into a rectangular flat plate-like shape having an area larger than that of the first coil 132, arranged in the optical axis direction L2 to have a predetermined gap between itself and the first coil 132, and fitted and fixed in the fitting hole 162 of the yoke holding member 160.

That is, the first drive mechanism 130 generates electromagnetic drive force in the first direction vertical to the optical axis L2, i.e., the direction of the straight line S4' by turning on/off energization with respect to the first coil 132.

The first yoke 133 is configured to form a magnetic circuit in cooperation with the first magnet 131 and the first coil 132 and can enhance a magnetic efficiency without increasing a drive load on the first drive mechanism 130 since it is fixed to (the fitting hole 102' of) the base 100.

Moreover, the first yoke 134 is arranged to sandwich the first magnet 131 and the first coil 132 between itself and the first yoke 133 in the optical axis direction L2 (i.e., the first yokes 133 and 134 are arranged on both sides), thereby further enhancing the magnetic efficiency.

As shown in FIG. 7, the second drive mechanism 140 is formed as a voice coil motor including the second magnet 141, the second coil 142, and the second yokes 143 and 144.

As shown in FIG. 12, the second magnet 141 is formed into a rectangular shape that is long in the direction of the straight line S4, and it is fitted and fixed in the fitting hole 103 of the base 100. Additionally, the second magnet 141 is magnetized to have an N pole and an S pole with a surface running through the straight line S4 as a border.

As shown in FIG. 10, the second coil 142 is formed into a substantially elliptic annular shape having a major axis in the direction of the straight line S4 and a minor axis in the direction of the straight line S3', and it is fitted and fixed in the fitting hole 113 of the movable holding member 110. Further, the second coil 142 is arranged in such a manner that its center C2 is placed on the second straight line S2 and its major axis forms an inclination angle of 45 degrees with respect to the second straight line S2. Furthermore, as shown in FIG. 9, FIG. 13, and FIG. 14, the second coil 142 has lead portions 142a and 142b inserted into and led out from the guide groove 119 of the movable holding member 110.

The second yoke 143 is formed into a rectangular shape that has an area equal to or above an area of the second magnet 141 with being in contact with the second magnet 141 and is long in the direction of the straight line S4, and it is fitted and fixed in the fitting hole 103' of the base 100 as shown in FIG. 7.

The second yoke 144 is formed into a rectangular flat plate-like shape having an area larger than that of the second coil 142, arranged to have a predetermined gap between itself and the second coil 142 in the optical axis direction L2, and fitted and fixed in the fitting hole 163 of the yoke holding member 160.

That is, the second drive mechanism 140 is configured to generate electromagnetic drive force in the second direction vertical to the optical axis L2, i.e., the direction of the straight line S3' by turning on/off energization with respect to the second coil 142.

The second yoke 144 is configured to form a magnetic circuit in cooperation with the second magnet 141 and the second coil 142, and it can enhance the magnetic efficiency without increasing a drive load on the second drive mechanism 140 since it is fixed to (the fitting hole 103' of) the base 100.

Furthermore, since the second yoke 144 is arranged to sandwich the second magnet 141 and the second coil 142 between itself and the second yoke 143 in the optical axis direction L2 (i.e., the second yokes 143 and 144 are arranged on both sides), the magnetic efficiency can be further enhanced.

As shown in FIG. 10 and FIG. 12, since the first drive mechanism 130 and the second drive mechanism 140 are arranged to be line-symmetric with respect to the first straight line S1 perpendicular to the optical axis L2 of the lenses G3, G4, and G5 held by the single movable holding member 110, drive loads imposed on the respective drive mechanisms are equal to each other, these drive mechanisms exercise drive forces on both sides of the lenses G3, G4, and G5, whereby the movable holding member 110 can be stably and smoothly driven within a plane vertical to the optical axis L2.

Moreover, since the first coil 132 and the second coil 142 are arranged in such a manner that each of their centers C1 and C2 is placed on the second straight line S2 perpendicular to the optical axis L2 of the lenses G3, G4, and G5 and the fist straight line S1 and each of their major axes forms the predetermined inclination angle with respect to the second straight line, when the movable holding member 110 has a shape that is long in the direction of the second straight line S2, the dimension of the movable holding member 110 can be reduced in the direction of the first straight line S1 by inclining the first coil 132 and the second coil 142, the movable holding member 110 can be stably and smoothly driven within the plane vertical to the optical axis L2 and, for example, a reduction in size and thickness of the device in the direction vertical to the optical axis L2 (the direction of the first straight line S1) can be achieved.

Further, since the movable holding member 110 is arranged in such a manner that the cylindrical portion 110a is inserted in the opening portion 101 of the base 100 and the flat plate portion 111 on both sides adjacently faces the base 100 in the optical axis direction L2, the movable holding member 110 can be arranged closer to the base 100 even in case of holding the plurality of lenses G3, G4, and G5, thereby reducing the thickness of the device in the optical axis direction L2.

Furthermore, the first magnet 131 and the second magnet 141 are fixed to the base 100, and the first coil 132 and the second coil 142 are fixed to the movable holding member 110, i.e., the first coil 132 and the second coil 142 are fixed to the movable holding member 110 holding the lenses G3, G4, and G5, whereby a module can be configured in accordance with specifications when changing, e.g., the numbers of turns of the first coil 132 and the second coil 142 based on specification of the lenses (e.g., the number, weights, and others).

As shown in FIG. 6, FIG. 13, and FIG. 14, the flexible wiring board 150 includes a first fixed portion 151 fixed onto the main surface F1 of the movable holding member 110 near the first coil 132 of the first drive mechanism 130, a second fixed portion 152 fixed onto the main surface F1 of the movable holding member 110 near the second coil 142 of the second drive mechanism 140, a common extending portion 153 extending in the direction of the first straight line S1 from the first fixed portion 151 and the second fixed portion 152 so as to deviate from the region of the main surface F1 of the movable holding member 110, first connecting portions 154a and 154b connecting the lead portions 132a and 132b of the first coil 132 on the extending portion 153, fourth connecting portions 155a and 155b connecting the lead portions 142a and 142b of the second coil 142 on the extending portion 153, and others.

Moreover, as shown in FIG. 13 and FIG. 14, the flexible wiring board 150 has a configuration that the first fixed portion 151 and the second fixed portion 152 are fixed to the main surface F1 of the movable holding member 110, the first connecting portions 154a and 154b and the second connecting portions 155a and 155b are simultaneously formed (soldered) on the extending portion 153 in a state that the extending portion 153 is supported from the lower side by, e.g., a jig, and then the extending portion 153 is bent along the side surface F2 of the movable holding member 110 by using, e.g., a curving machine (a tool).

Additionally, as shown in FIG. 3, the flexible wiring board 150 is arranged in the unit case 10 in a bendable manner and electrically connected with the drive circuit 85 and the position detection circuit 86.

As described above, the flexible wiring board 150 has the first connecting portions 154a and 154b and the second connecting portions 155a and 155b (soldering portions and others) of the first coil 132 and the second coil 142 on the common extending portion 153 protruding from the region of the main surface F1 of the movable holding member 110, and this extending portion 153 is bent along the side surface F2 of the movable holding member 110 after the connecting operation, whereby a soldering operation can be carried out at a time in a region apart from the lens G5 on the same side. Therefore, damages and others caused due to heat at the time of soldering can be avoided, and even an operator who is not very skillful can readily perform the connecting (soldering) operation.

Further, pulling out the lead portions 132a, 132b, 142a, and 142b of the first coil 132 and the second coil 142 through the guide groove 119 enables easily effecting the wiring operation, and components can be put together, and the thickness and the size of the device can be reduced.

Furthermore, since each of the first coil 132 and the second coil 142 is formed into the substantially elliptic annular shape having the major axis and the minor axis and arranged in such a manner that each major axis forms a predetermined inclination angle with respect to the first straight line S1 and the extending portion 153 of the flexible wiring board 150 is formed to extend and bend in the direction of the first straight line S1, the dimension of the movable holding member 110 can be reduced in the direction of the first straight line S1 when the movable holding member 110 has a shape that is long in the direction of the second straight line S2 perpendicular to the first straight line S1 and the optical axis L2, thus achieving, e.g., a reduction in size and thickness of the device in the direction of the first straight line S1.

The first position sensor 170 is, e.g., a hall element that detects a change in magnetic flux density and outputs it as an electric signal, and it is fitted and fixed in the fitting hole 114 of the movable holding member 110 as shown in FIG. 10. Moreover, the first position sensor 170 is configured to detect a change in position by detecting a change in magnetic flux density caused when the movable holding member 110 relatively moves with respect to (the first magnet 131) of the base 100 in the region of the first drive mechanism 130. It is to be noted that the first position sensor 170 is configured to be electrically connected with the flexible wiring board 150 in a connecting portion (not shown) provided in a region near the first connecting portions 154a and 154b.

The second position sensor 180 is, e.g., a hall element that detects a change in magnetic flux density and outputs it as an electric signal, and it is fitted and fixed in the fitting hole 115 of the movable holding member 110 as shown in FIG. 10. Additionally, the second position sensor 180 is configured to detect a change in position by detecting a change in magnetic flux density caused when the movable holding member 110 relatively moves with respect to (the second magnet 141 of) the base 100 in the region of the second drive mechanism 140. It is to be noted that the second position sensor 180 is configured to be electrically connected with the flexible wiring board 150 in a connecting portion (not shown) provided in a region near the second connecting portions 155a and 155b.

A correcting operation of the image blur correction device M will now be briefly described with reference to FIG. 15A to FIG. 15C.

Figure 15A:
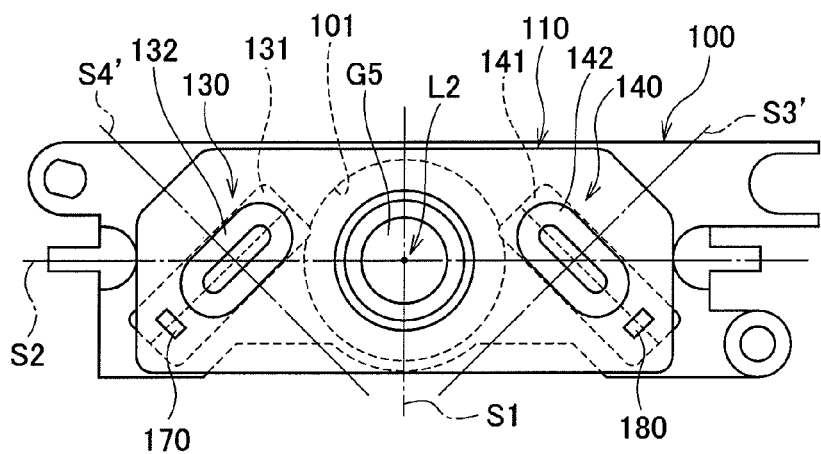
FIG. 15A is a plan view for explaining an operation of the image blur correction device.
Figure 15B:
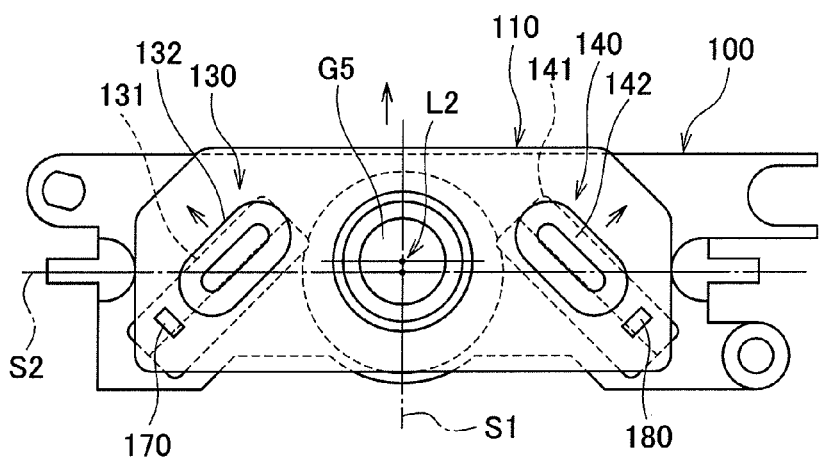
FIG. 15B is a plan view for explaining an operation of the image blur correction device.
Figure 15C:
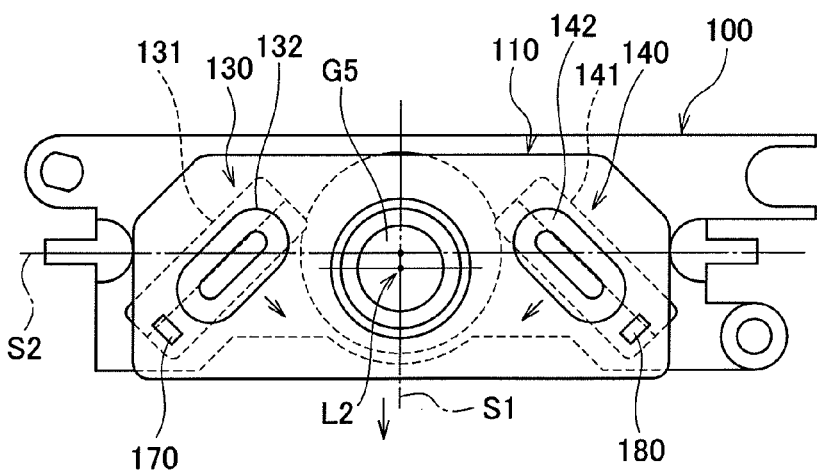
FIG. 15C is a plan view for explaining an operation of the image blur correction device.

First, as shown in FIG. 15A, when upwardly shifting the movable holding member 110 (the lenses G3, G4, and G5) from a state that the center of the opening portion 101 of the base 100 coincides with the optical axis L2 of the lenses G3, G4, and G5 of the movable holding member 110 as an example, drive force is generated in the first drive mechanism 130 along an obliquely upward direction of the first direction (the direction of the straight line S4'), and drive force is also generated in the second drive mechanism 140 along an obliquely upward direction of the second direction (the direction of the straight line S3'). As a result, the movable holding member 110 is upwardly moved in the direction of the first straight line S1 as shown in FIG. 15B.

Moreover, as shown in FIG. 15A, when downwardly shifting the movable holding member 110 (the lenses G3, G4, and G5) from the state that the center of the opening portion 101 of the base 100 coincides with the optical axis L2 of the lenses G3, G4, and G5 of the movable holding member 110 as an example, drive force is generated in the first drive mechanism 130 along the obliquely downward direction of the first direction (the direction of the straight line S4'), and drive force is also generated in the second drive mechanism 140 along the obliquely downward direction of the second direction (the direction of the straight line S3'). As a result, as shown in FIG. 15C, the movable holding member 110 is downwardly moved in the direction of the first straight line S1.

Figure 16:
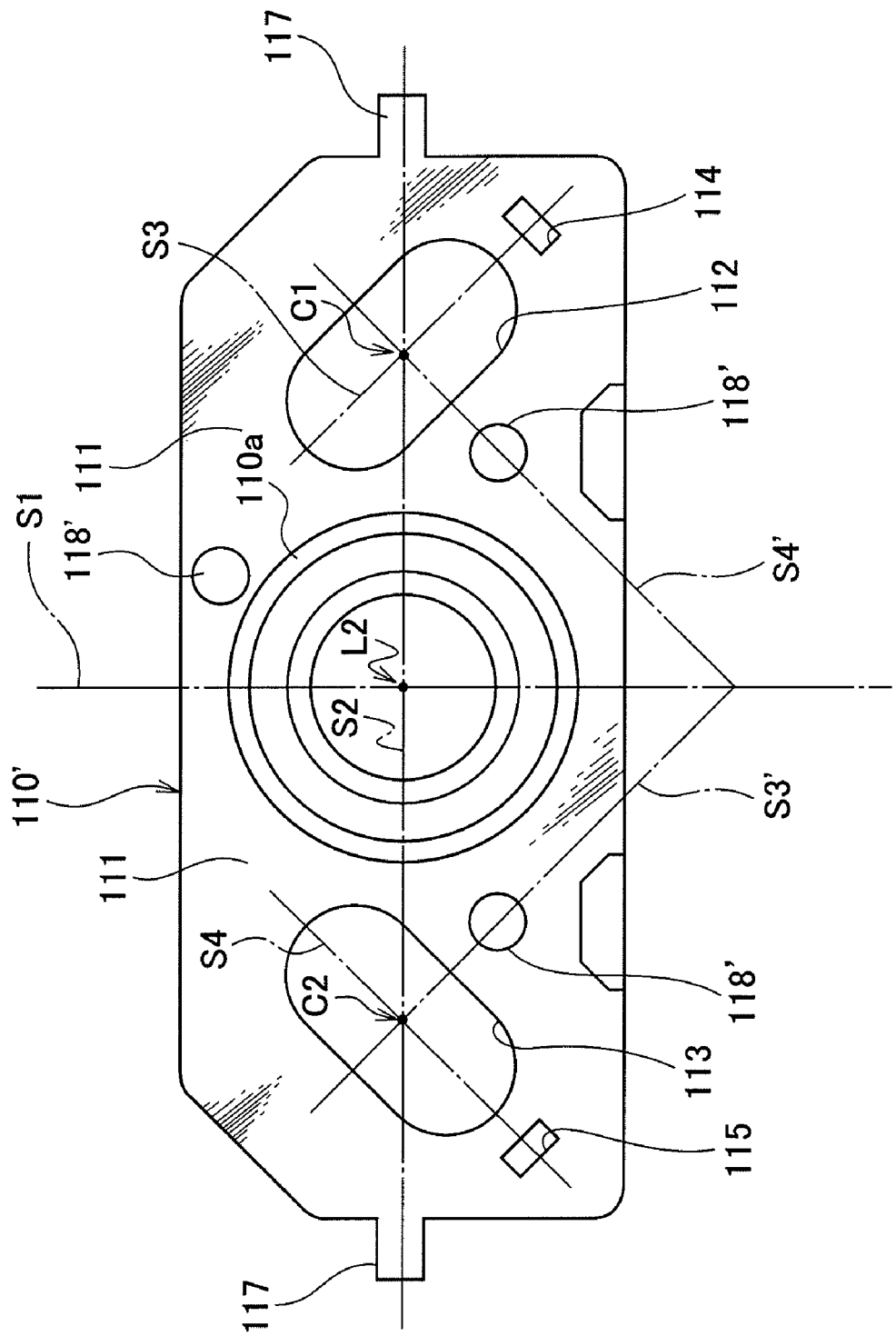
FIG. 16 is a view showing a surface of a movable holding member on a side facing a base in another embodiment of the image blur correction device according to the present invention.

FIG. 16 shows another embodiment of the image blur correction device M according to the present invention, a part of the movable holding member is changed with respect to the foregoing embodiment, and like reference numerals denote structures equal to those in the foregoing embodiment to omit a detailed description thereof.

That is, in this embodiment, three protrusions 118' are provided on a surface of the movable holding member 110' on a side facing the base 100.

The three protrusions 118' are formed to slidably come into contact with the receiving surface 108 of the base 100 in such a manner that the movable holding member 110' is movably supported while being adjacent to the base 100.

In this embodiment, the movable holding member 110' and the base 100 are urged by the urging spring 120, and the movable holding member 110' is supported to be movable with respect to the base 100 by slidably receiving the protrusions 118' on the receiving surface 108, thereby reducing a thickness of the device in the optical axis direction L2 while achieving simplification of the structure and a decrease in the number of the components.

Figure 17:
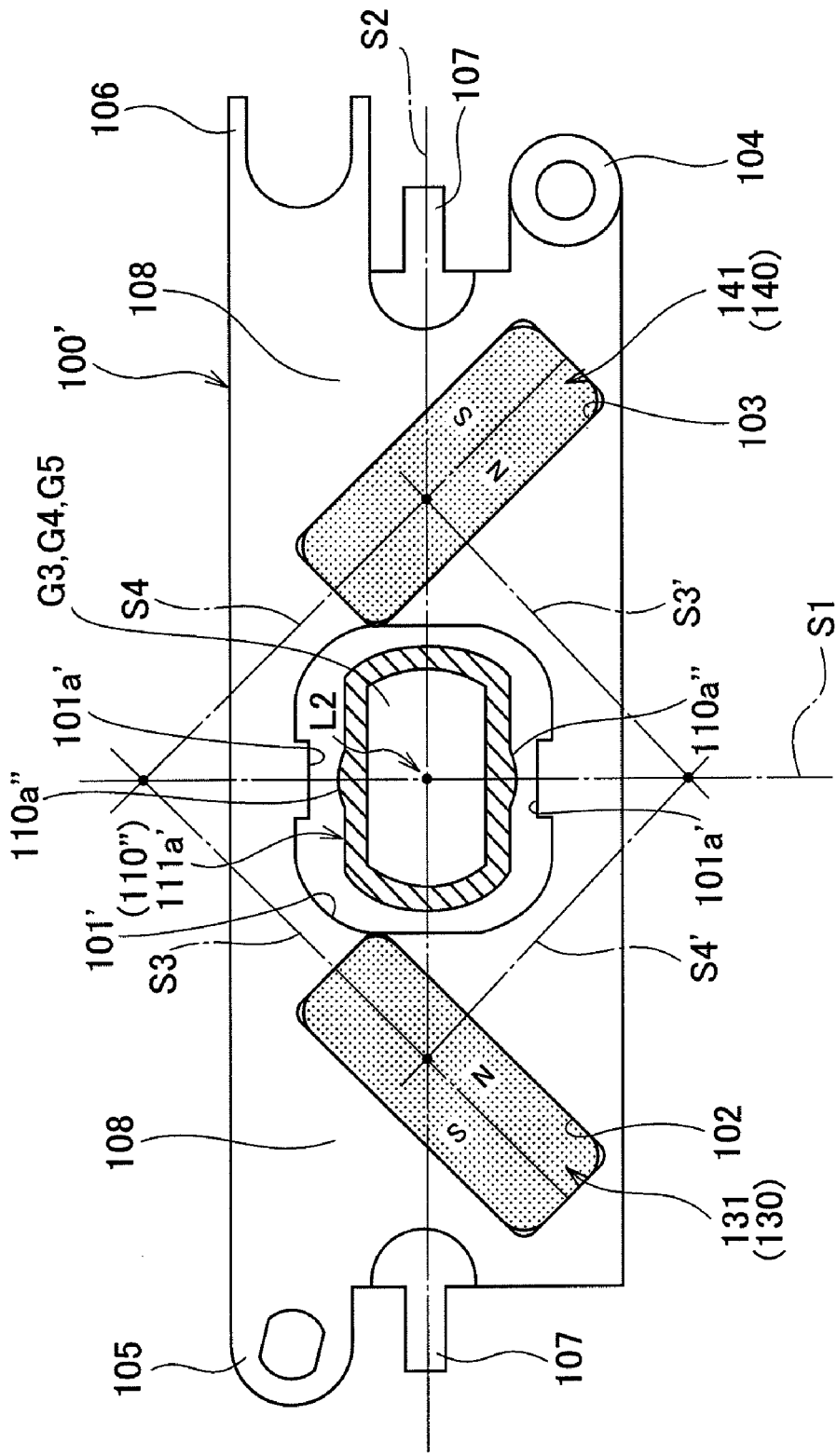
FIG. 17 is a schematic plan view showing a base and a part (a cylindrical portion) of a movable holding member in still another embodiment of the image blur correction device according to the present invention.

FIG. 17 is a schematic view showing still another embodiment of the image blur correction device M according to the present invention, positions of the base and the movable holding member are changed with respect to the foregoing embodiment, and like reference numerals denote structure equal to those in the foregoing embodiment to omit a description thereof.

That is, in this embodiment, as shown in FIG. 17, a base 100' has an opening portion 101' that defines an inner side surface parallel to the direction of the first straight line S2, and it is formed on a wall surface of the opening portion 101' to define two convex flat portions 101a' protruding toward the inner side in the direction of the first straight line S1. Further, as shown in FIG. 17, a movable holding member 110" has a cylindrical portion 110a' in which lenses G3, G4, and G5 each having two surfaces parallel to an outer periphery are fitted and held, and the cylindrical portion 110' is formed to define two circular portions 110a" protruding in a circular surface shape having the optical axis L2 at the center along the direction of the first straight line S1.

Furthermore, the opening portion 101' is formed with an inner diameter dimension that allows the cylindrical portion 110a' to pass therethrough in a contactless manner in the range where the movable holding member 110" is driven, and the circular portions 110a" come into contact with the convex flat portions 101a' of the opening portion 101' if the movable holding member 110a" has moved a predetermined distance or above in the direction of the first straight line S1.

Figure 18A:
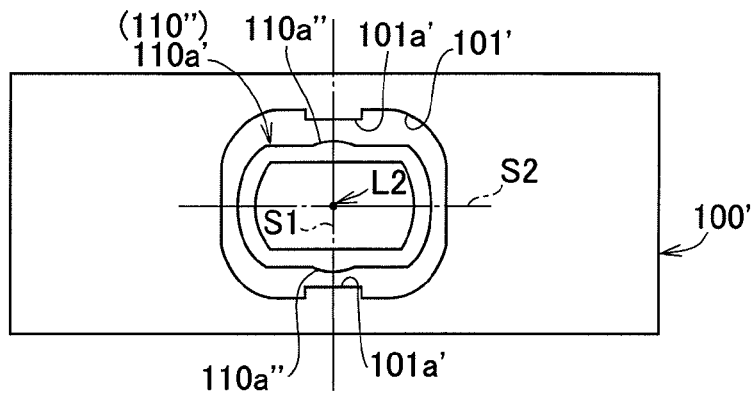
FIG. 18A is a schematic view for explaining an operation in the image blur correction device depicted in FIG. 17.
Figure 18B:
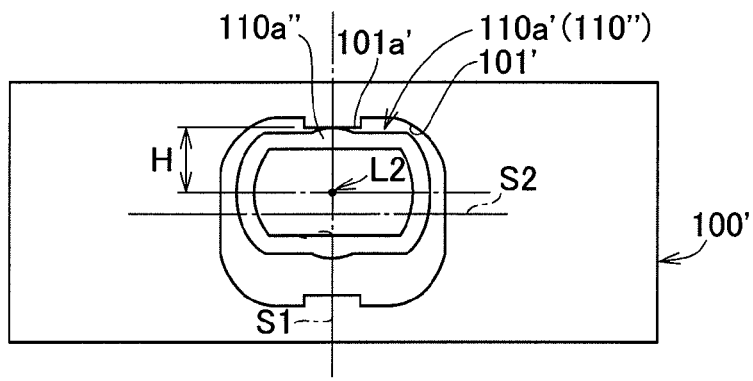
FIG. 18B is a schematic view for explaining the operation in the image blur correction device depicted in FIG. 17.
Figure 18C:
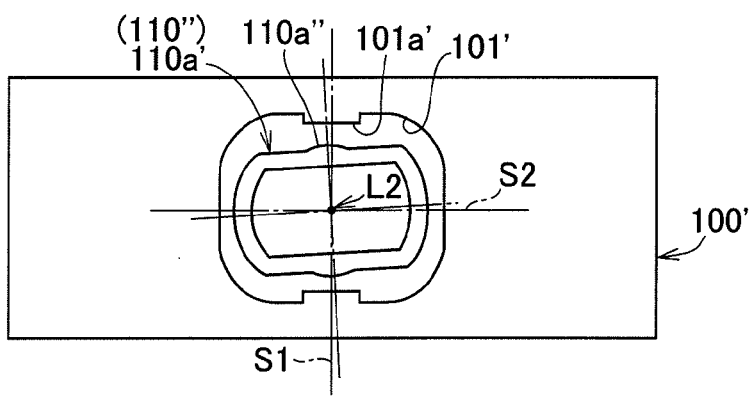
FIG. 18C is a schematic view for explaining the operation in the image blur correction device depicted in FIG. 17.
Figure 18D:
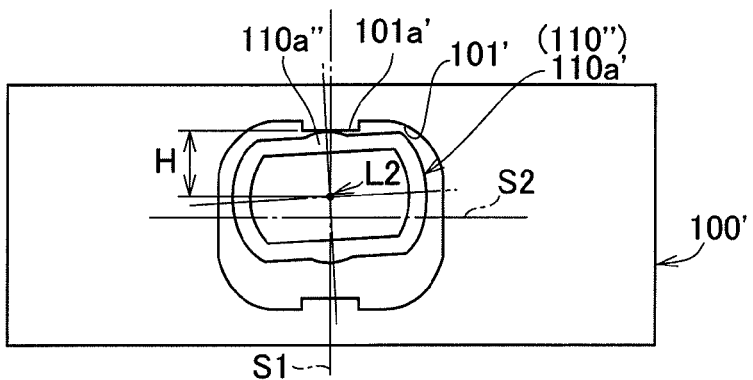
FIG. 18D is a schematic view for explaining the operation in the image blur correction device depicted in FIG. 17.
Figure 19:
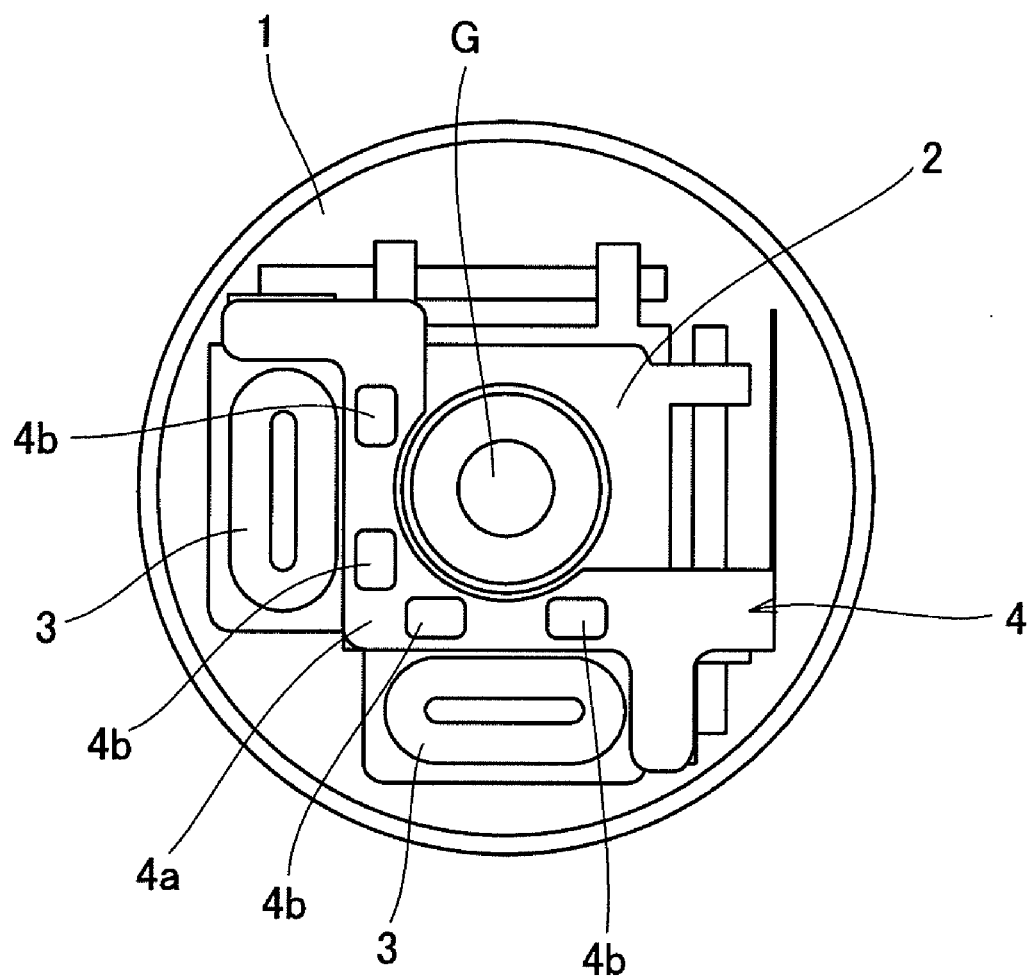
FIG. 19 is a plan view showing a conventional image blur correction device.

In this embodiment, a distance H from the optical axis L2 to the convex flat portion 101a' in a situation that the movable holding member 110" moves upward as shown in FIG. 18B from a state that the center of the opening portion 101' of the base 100' coincides with the center L2 of the cylindrical portion 110a' (lenses) and the circular portion 110a" of the cylindrical portion 110a' is thereby brought into contact with the convex flat portion 101a' of the base 100' is equal to a distance H from the optical axis L2 to the convex flat portion 101a' in a situation that the movable holding member 110" moves upward as shown in FIG. 18D from a state that the movable holding member 110" is inclined at a predetermined angle as depicted in FIG. 18C and the circular portion 110a"

of the cylindrical portion 110a' is thereby brought into contact with the convex flat portion 101a' of the base 100'.

Accordingly, even if the movable holding member 110" is inclined due to rotation, the center (the optical axis) L2 of the lenses can accurately coincide with the optical axis of the camera unit (the center of the opening portion 101' of the base 100'), thus highly accurately correcting an image blur.

In the foregoing embodiments, as the technique for movably supporting the movable holding member 110, 110', or 110" to be adjacent to the base 100 or 100', the example where the plurality of protrusions 118 or 118' formed on the movable holding member 110, 110', or 110" and the receiving surface 108 formed on the base 100 or 100' are adopted has been described, but the present invention is not limited thereto, and the receiving surface may be formed on the movable holding member and the plurality of protrusions may be formed on the base as a reverse pattern.

Further, in the foregoing embodiments, as the technique for constantly bringing the plurality of protrusions 118 or 118' into contact with the receiving surface 108, the example where the urging spring 120 is adopted has been described, but the present invention is not limited thereto, a regulation mechanism or a guide mechanism that regulates separation of both the members without exercising urging force may be adopted.

In the foregoing embodiments, although the configuration that each of the first coil 132 and the second coil 142 is formed into the substantially elliptic annular shape has been described, this "substantially elliptic annular shape" is a concept including a substantially rectangular annular shape consisting of wide sides (major axes) and narrow sides (minor axes) including straight line portions besides an elliptic annular shape.

In the foregoing embodiments, although the image blur correction device has been described, a configuration including an image blur correction device having the above configuration may be adopted in an imaging lens unit including a plurality of lenses for imaging.

As a result, when the configuration where the plurality of lenses for imaging are arranged in the optical axis direction includes the above-described image blur correction device, the correction lenses G3, G4, and G5 held by the movable holding member 110, 110', or 110" are appropriately driven, and an image blur caused due to hand movement and others can be smoothly and highly accurately corrected. That is, the imaging lens unit having the image bur correcting function in addition to the plurality of lenses for imaging can be provided.

As described above, since the image blur correction device according to the present invention can highly accurately correct an image blur caused due to hand movement while achieving, e.g., simplification of the structure and a reduction in size and thickness of the device in the optical axis direction of the lenses and the direction vertical to the optical axis direction, it can be of course applied to a camera unit mounted in a personal digital assistance such as a mobile phone and a portable music player that are demanded to be reduced in size and thickness, and it is also useful in a regular digital camera or any other portable optical device.

The invention claimed is:
1. An image blur correction device comprising:
a substantially tabular base having an opening portion;
a substantially tabular movable holding member that is configured to hold a lens and supported to be movable within a plane perpendicular to an optical axis of the lens;
a first drive mechanism including a first magnet and a first coil so as to drive the movable holding member in a first direction perpendicular to the optical axis;
a second drive mechanism including a second magnet and a second coil so as to drive the movable holding member in a second direction perpendicular to the optical axis; and
a detecting means for detecting a position of the movable holding member,
wherein the movable holding member is movably supported to be adjacent to the base,
the first drive mechanism and the second drive mechanism are arranged at positions that are line-symmetric with respect to a first straight line perpendicular to the optical axis of the lens,
each of the first coil and the second coil is formed into a substantially elliptic annular shape having a major axis and a minor axis and arranged in such a manner that each center is laced on a second straight line perpendicular to the optical axis of the lens and the first straight line,
the major axis of the first coil is arranged on a third straight line running through a magnetized boundary face of the first magnet,
the major axis of the second coil is arranged on a fourth straight line running through a magnetized boundary face of the second magnet,
the third straight line and the fourth straight line are arranged to form a predetermined inclination angle with respect to the second straight line, and
the detecting means includes a first position sensor that is arranged on the major axis of the first coil and detects a magnetic change by relatively moving with respect to the first magnet, and a second position sensor that is arranged on the major axis of the second coil and detects a magnetic change by relatively moving with respect to the second magnet.

2. The image blur correction device according to claim 1, wherein one of the movable holding member and the base has a plurality of protrusions protruding in an optical axis direction,
the other of the movable holding member and the base has a receiving surface configured to slidably receive the protrusions, and
an urging spring that urges the protrusions toward the receiving surface is provided to the movable holding member and the base in a tensioned state.

3. The image blur correction device according to claim 2, wherein the movable holding member has a cylindrical portion configured to hold the lens and a flat plate portion extending in a direction of the second straight line from both sides of the cylindrical portion, and
the cylindrical portion is inserted in the opening portion of the base in a contactless manner.

4. The image blur correction device according to claim 2, wherein the first magnet and the second magnet are fixed to the base, and
the first coil and the second coil are fixed to the movable holding member.

5. The image blur correction device according to claim 4, further comprising a flexible wiring board to which the first coil and the second coil are electrically connected,
wherein the flexible wiring board includes:
a first fixed portion fixed near the first coil and a second fixed portion fixed near the second coil on a main surface of the movable holding member facing the optical axis direction;

a common extending portion extending from the first fixed portion and the second fixed portion so as to deviate from a main surface region of the movable holding member; and a first connecting portion connected with the first coil and a second connecting portion connected with the second coil on the extending portion, and wherein the extending portion is bent along a side surface of the movable holding member.

6. The image blur correction device according to claim 5, wherein the movable holding member has a guide groove through which a lead portion of the first coil and a lead portion of the second coil are led out.

7. The image blur correction device according to claim 5, wherein the extending portion of the flexible wiring board is formed to extend in a direction of the first straight line.

8. The image blur correction device according to claim 1, wherein a first yoke configured to form a magnetic circuit in cooperation with the first magnet and the first coil and a second yoke configured to form a magnetic circuit in cooperation with the second magnet and the second coil are fixed to the base.

9. The image blur correction device according to claim 8, wherein the first yoke is arranged on both sides sandwiching the first magnet and the second coil in an optical axis direction, and the second yoke is arranged on both sides sandwiching the second magnet and the second coil in the optical axis direction.

10. An imaging lens unit including a plurality of lenses for imaging, wherein the imaging lens unit includes the image blur correction device according to claim 1.

11. A camera unit including an imaging element, wherein the camera unit includes the image blur correction device according to claim 1.

* * * * *